United States Patent [19]

Miyashita

[11] Patent Number: 5,136,397
[45] Date of Patent: Aug. 4, 1992

[54] LIQUID CRYSTAL VIDEO PROJECTOR HAVING LAMP AND COOLING CONTROL AND REMOTE OPTICS AND PICTURE ATTRIBUTE CONTROLS

[75] Inventor: Kiyoshi Miyashita, Suwa, Japan

[73] Assignee: Seiko Epson Corporation, Tokyo, Japan

[21] Appl. No.: 814,330

[22] Filed: Dec. 23, 1991

Related U.S. Application Data

[63] Continuation of Ser. No. 605,292, Oct. 29, 1990, abandoned.

[30] Foreign Application Priority Data

Oct. 31, 1989 [JP] Japan .................... 1-283532

[51] Int. Cl.⁵ ........................ H04N 5/74; G03B 21/00
[52] U.S. Cl. .................... 358/236; 315/225; 352/140; 353/57; 353/85; 353/101; 358/194.1
[58] Field of Search ............ 353/52-61, 353/85, 101; 352/139, 140, 198, 202, 203; 358/194.1, 231, 232, 236, 60; 315/200 R, 209 R, 129, 133, 134, 225

[56] References Cited

U.S. PATENT DOCUMENTS

| | | | |
|---|---|---|---|
| 4,150,887 | 4/1979 | Huber | 353/85 |
| 4,283,658 | 8/1981 | Parker | 353/57 X |
| 4,739,396 | 4/1988 | Hyatt | 358/60 |
| 4,763,044 | 8/1988 | Nuckolls et al. | 315/225 X |
| 4,907,873 | 3/1990 | Kuriyama | 352/140 |
| 4,925,295 | 5/1990 | Ogawa et al. | 353/57 |
| 4,941,036 | 7/1990 | Itoh | 358/194.1 X |
| 4,951,131 | 8/1990 | Lindahl | 358/194.1 |
| 4,964,719 | 10/1990 | Tachikawa et al. | 353/85 |
| 4,988,187 | 1/1991 | Kuriyama | 353/101 |

FOREIGN PATENT DOCUMENTS

| | | |
|---|---|---|
| 0192023 | 8/1986 | European Pat. Off. . |
| 0239024 | 9/1987 | European Pat. Off. . |
| 61-154377 | 7/1986 | Japan . |
| WO89/06417 | 7/1989 | PCT Int'l Appl. . |

*Primary Examiner*—James J. Groody
*Assistant Examiner*—Mark R. Powell

[57] ABSTRACT

A video projection system having a liquid crystal panel with a video image, a projection lamp with ON/OFF control, a zoom lens with a zoom control mechanism, a focusing lens with a focusing control mechanism, an audio system with a volume control, a projection-lamp light detector, a heat sensor, a variable-speed cooling fan, a control module having a microprocessor and a digital-to-analog converter, a display, a keypad, an alarm/annunciator, a power supply with ON/OFF control, and an infrared based remote control system able to control power ON/OFF, zoom, focus, picture, and sound volume.

29 Claims, 38 Drawing Sheets

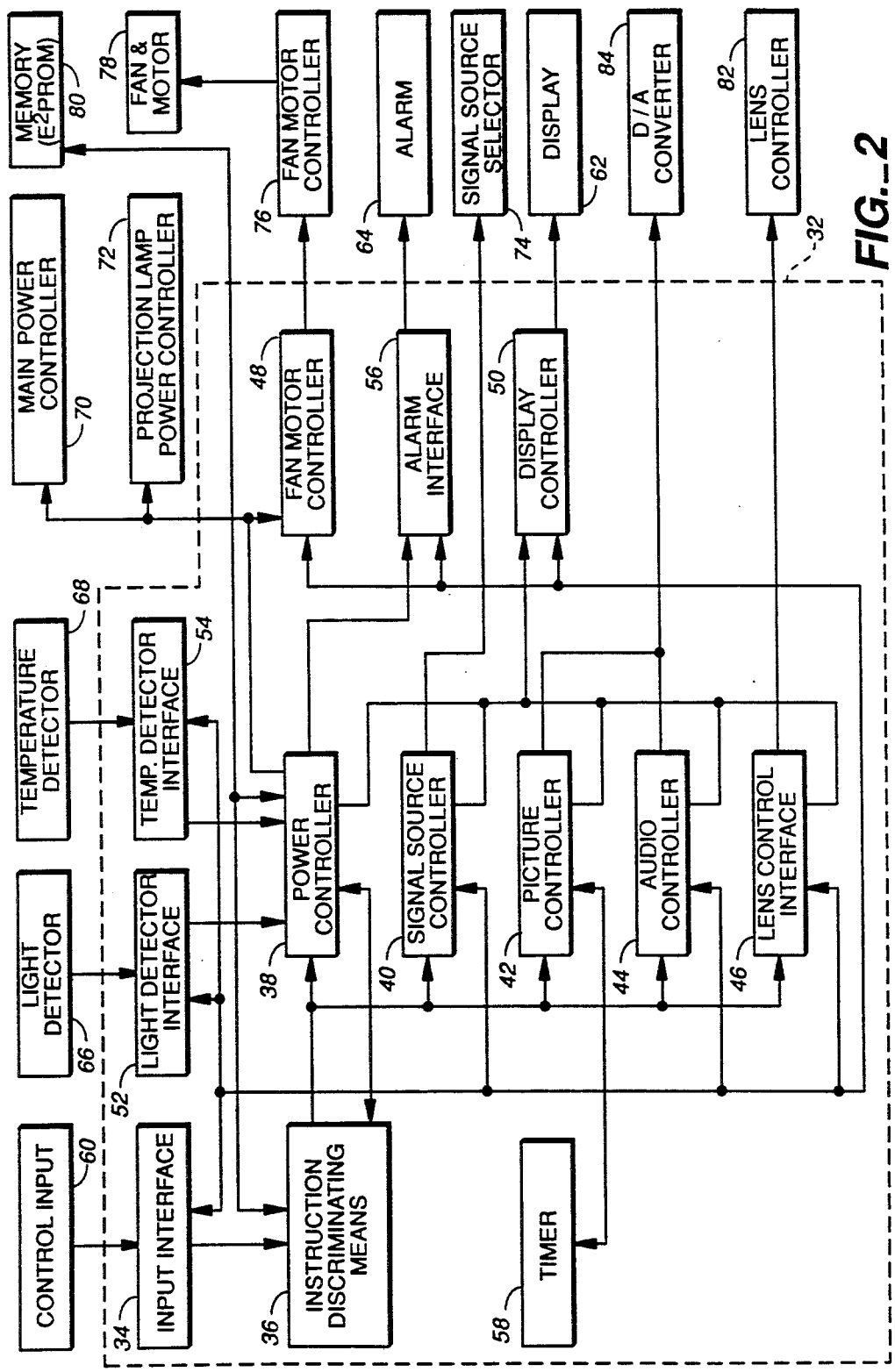
FIG._2

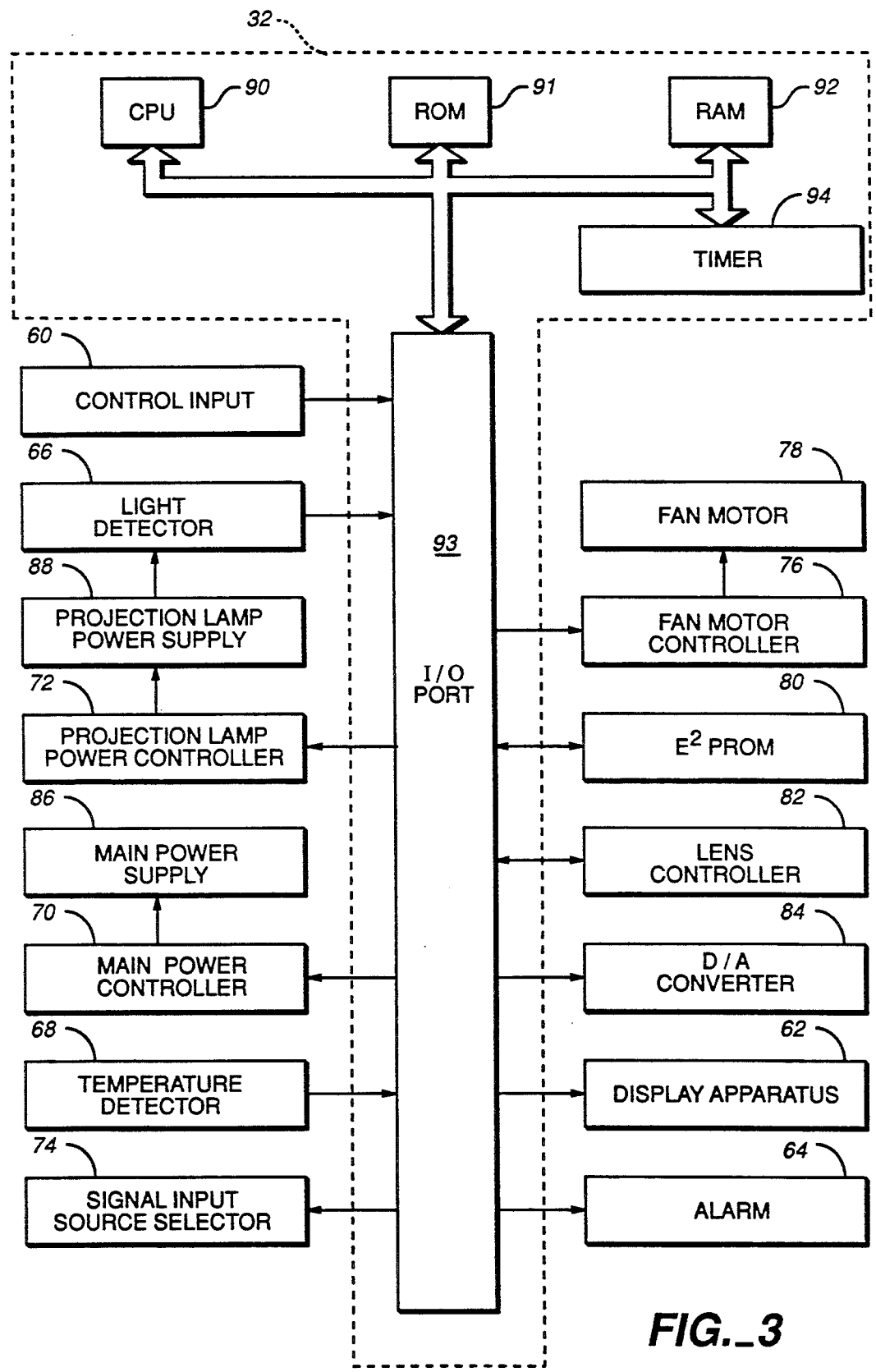
FIG._3

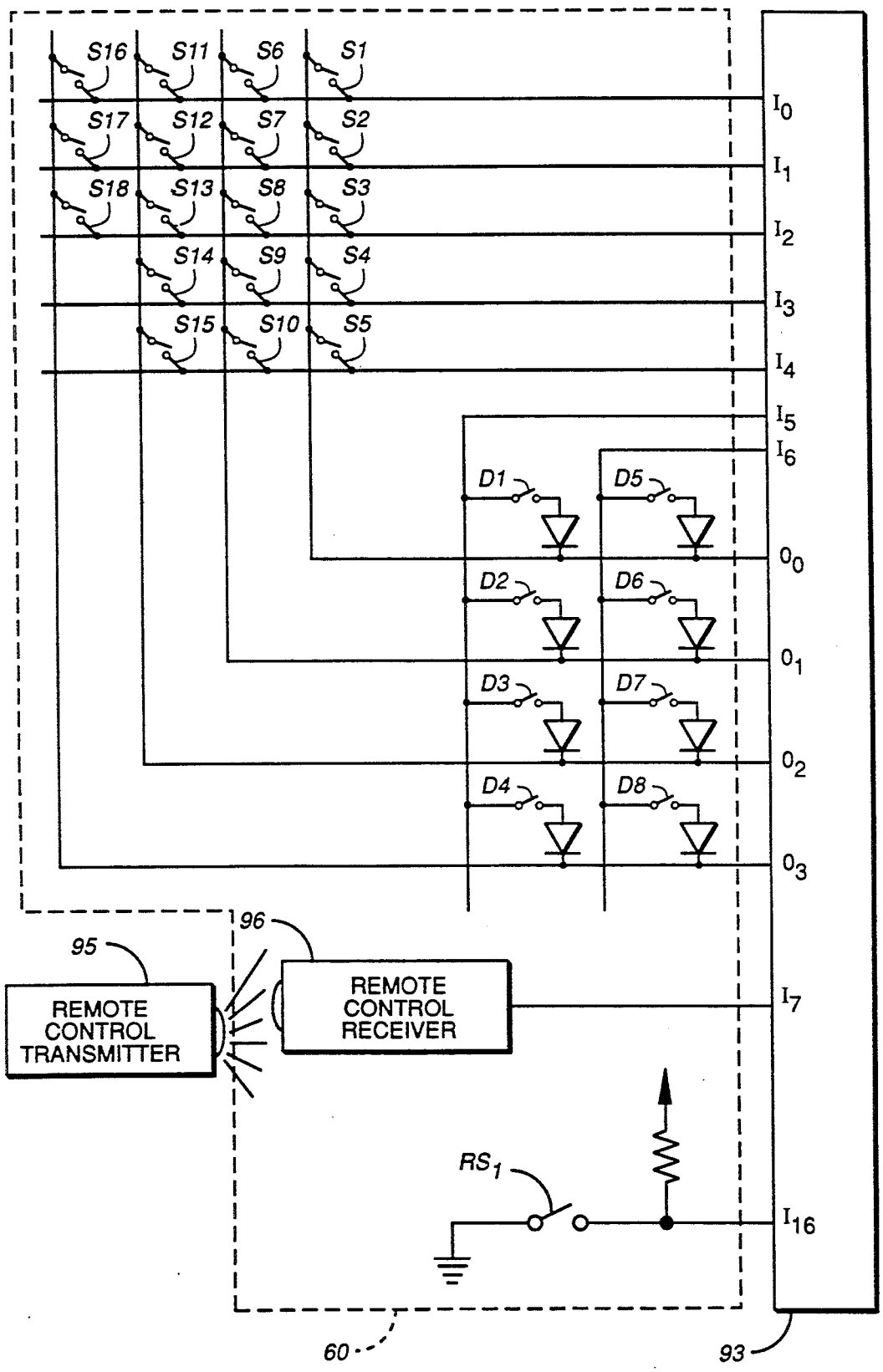
FIG._4

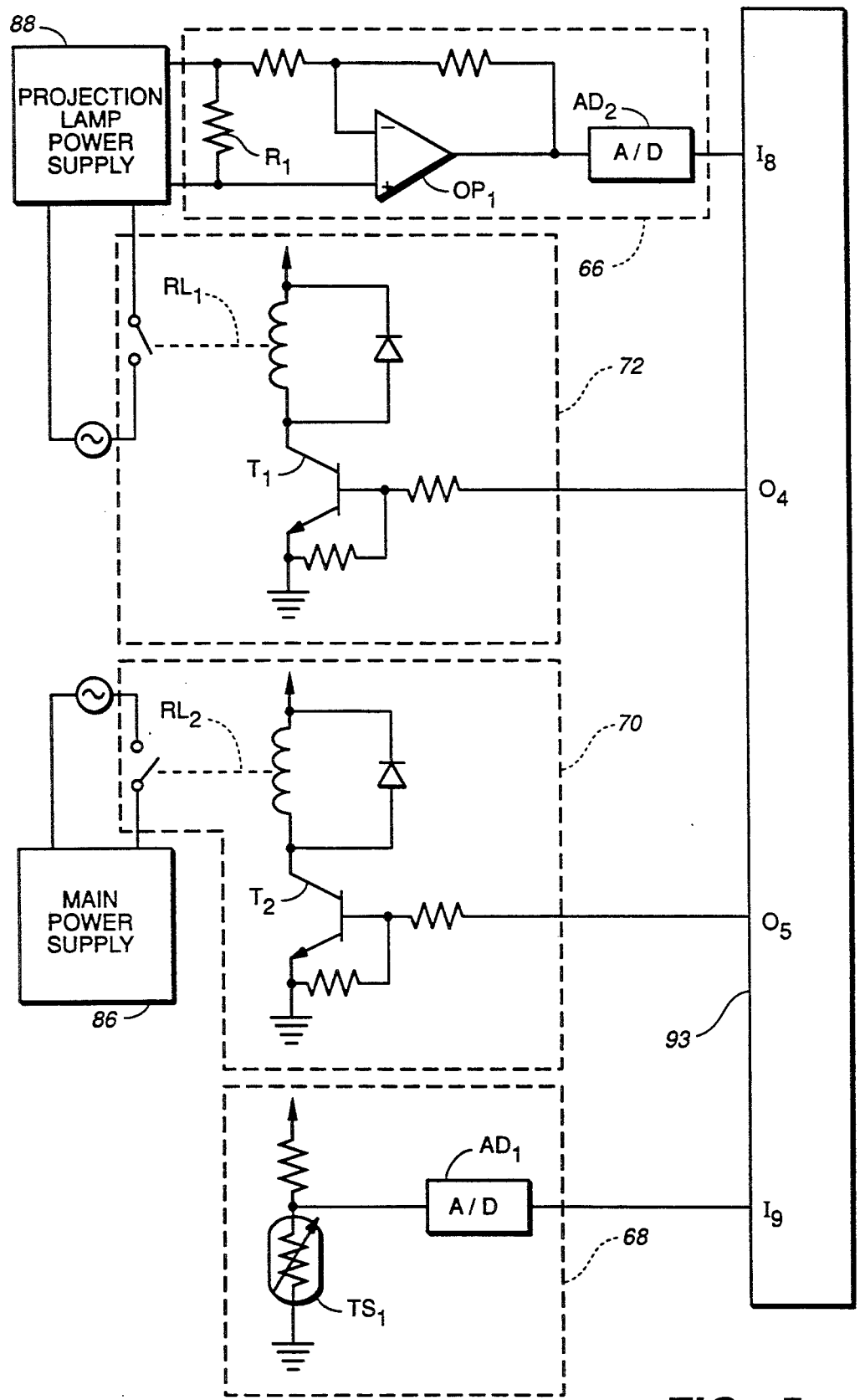
FIG._5

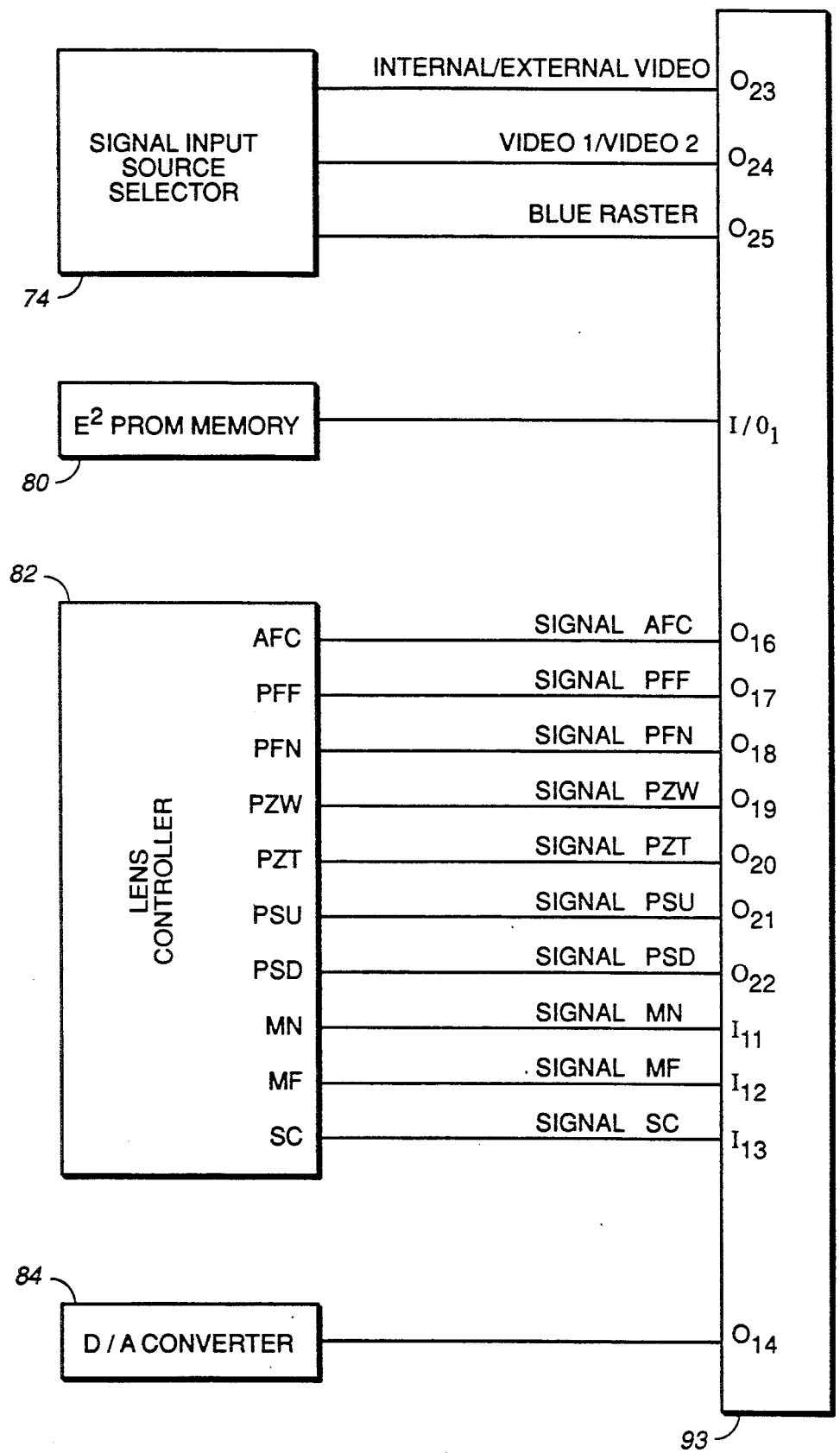
FIG._6

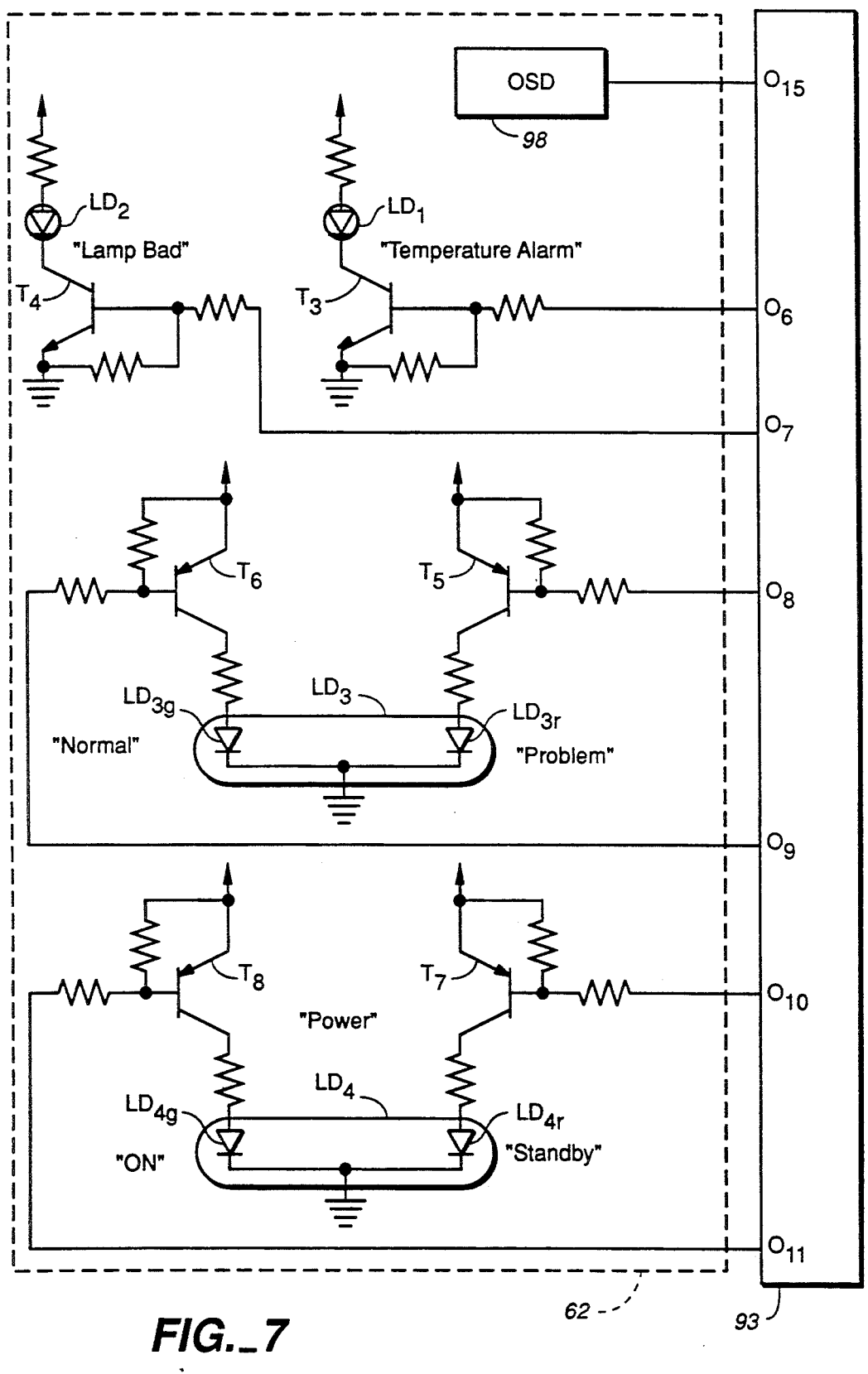
*FIG._7*

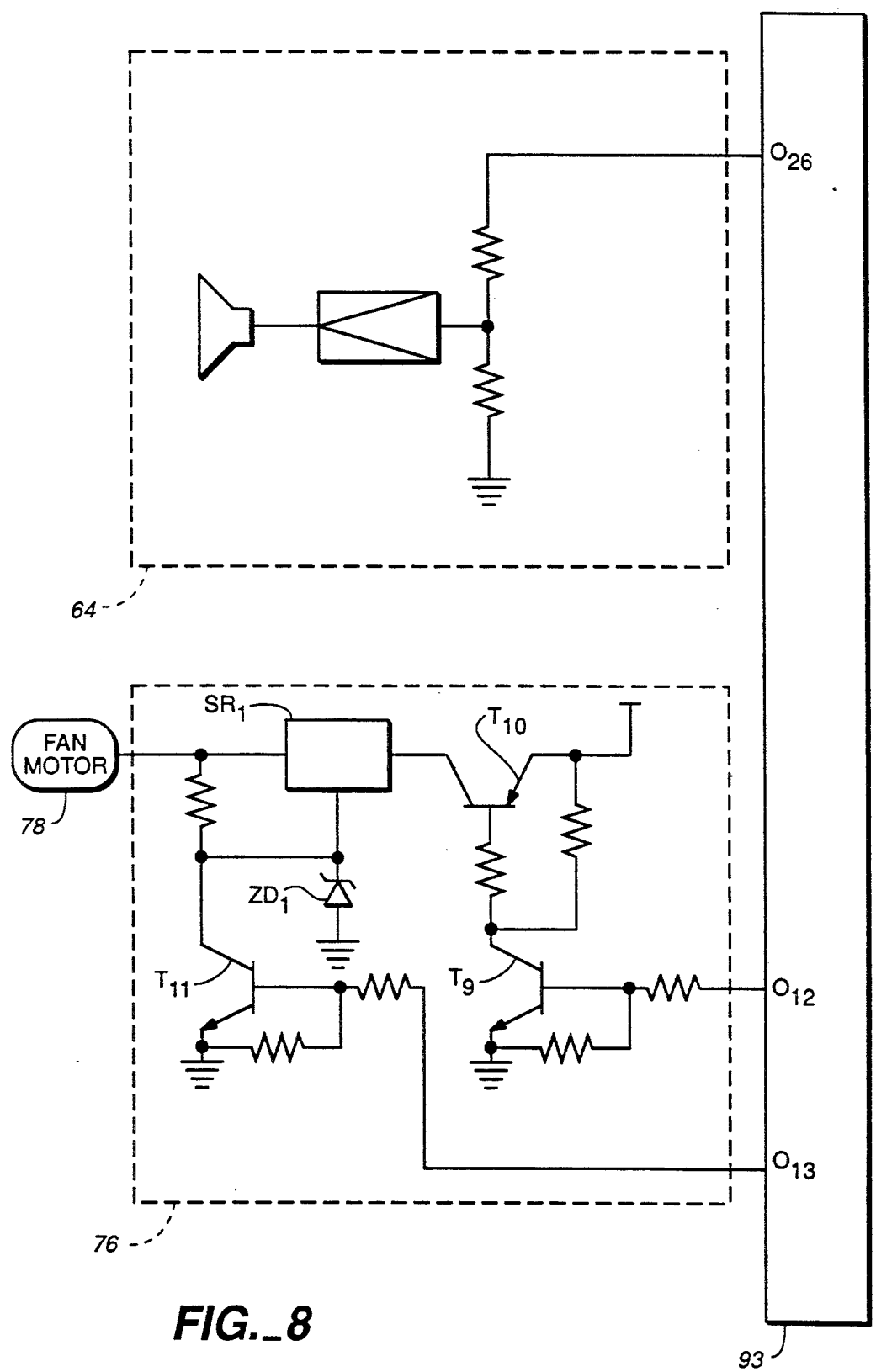
FIG._8

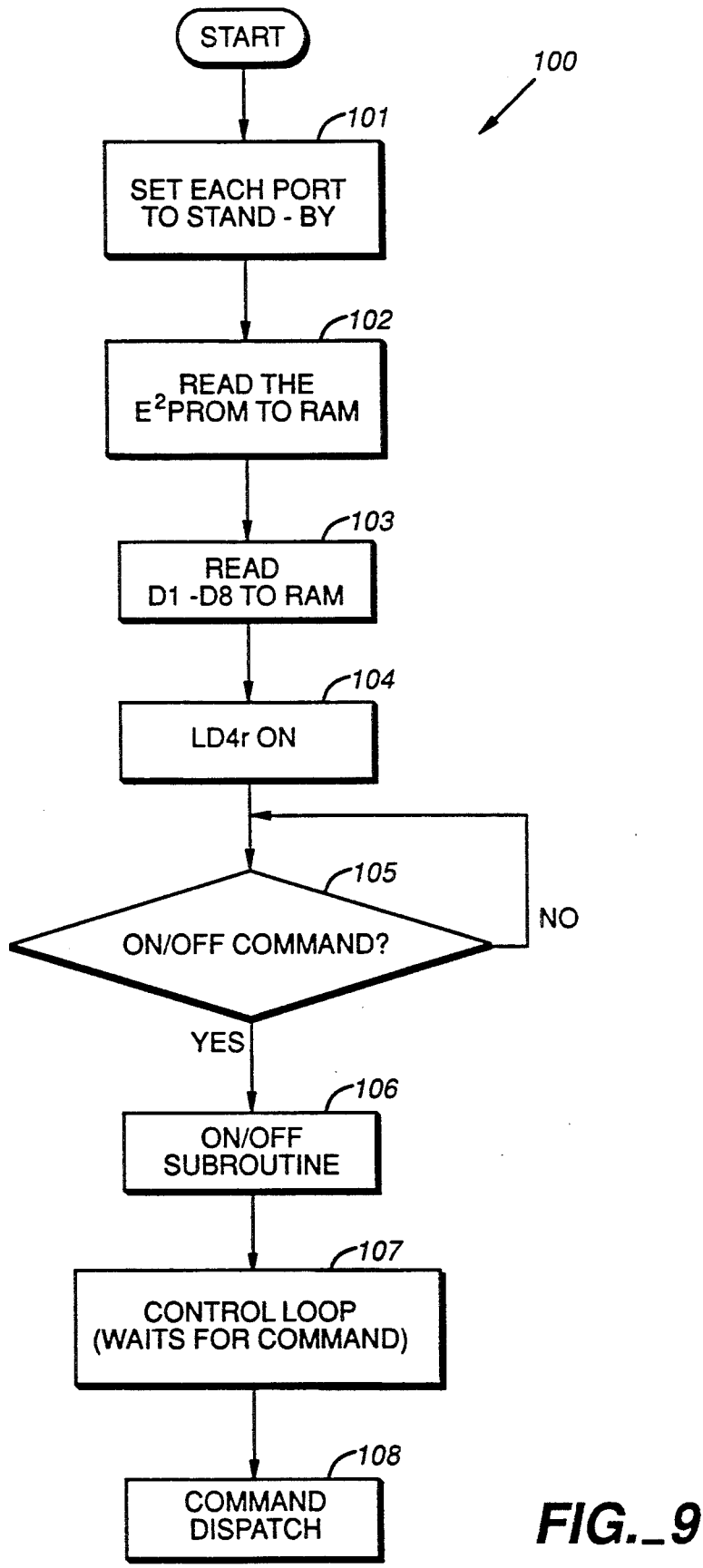
FIG._9

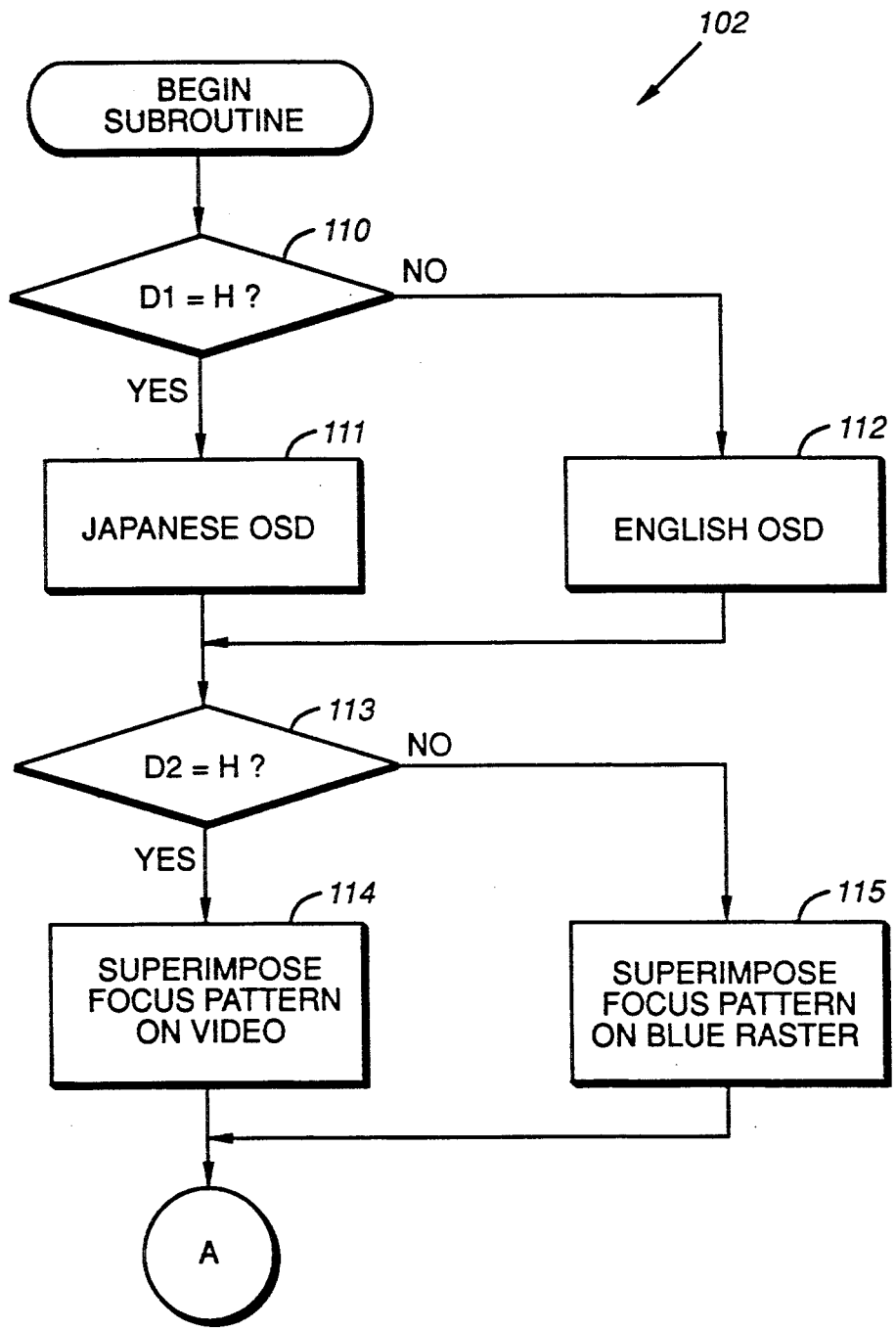
FIG._10A

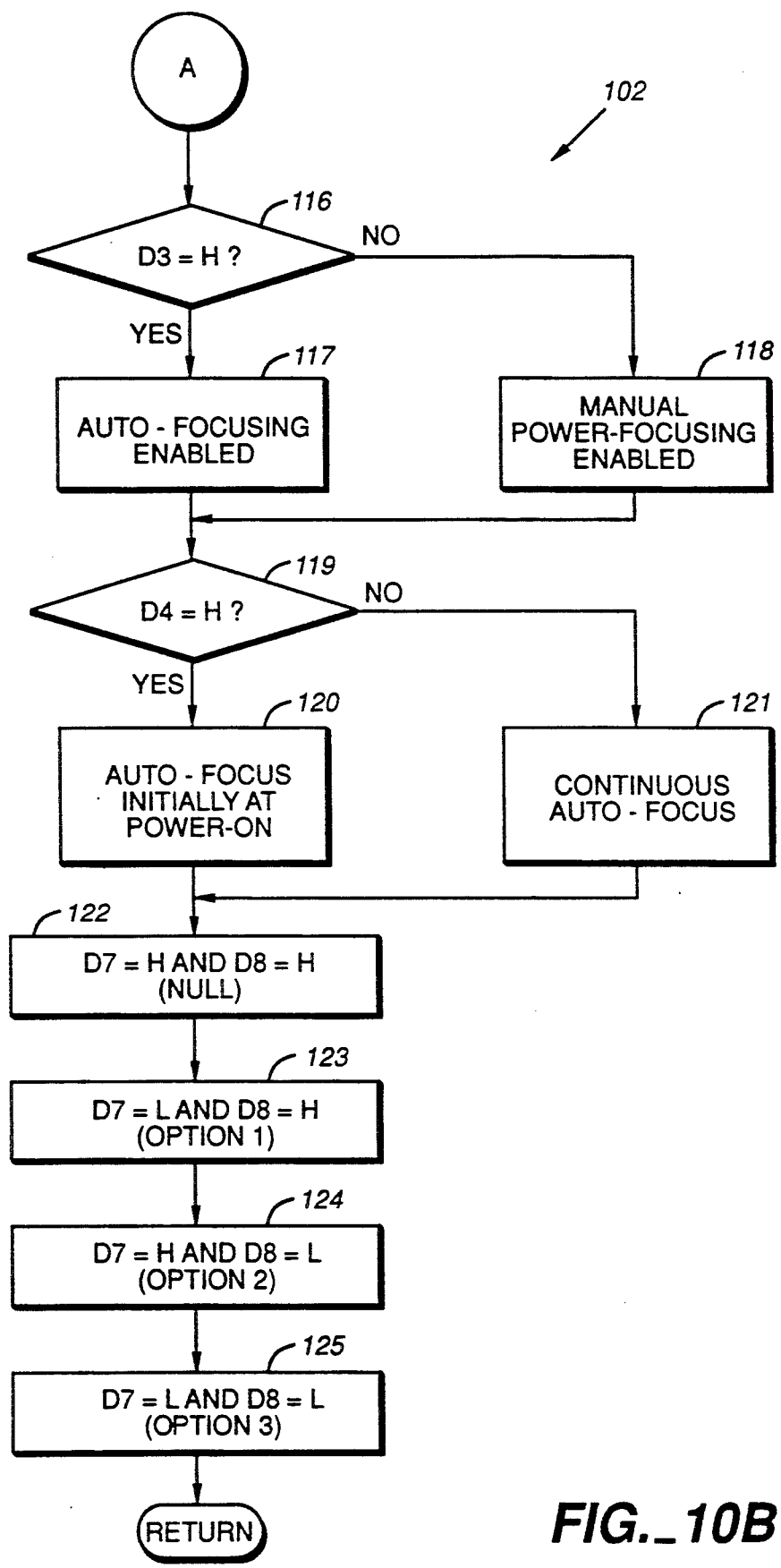
FIG._10B

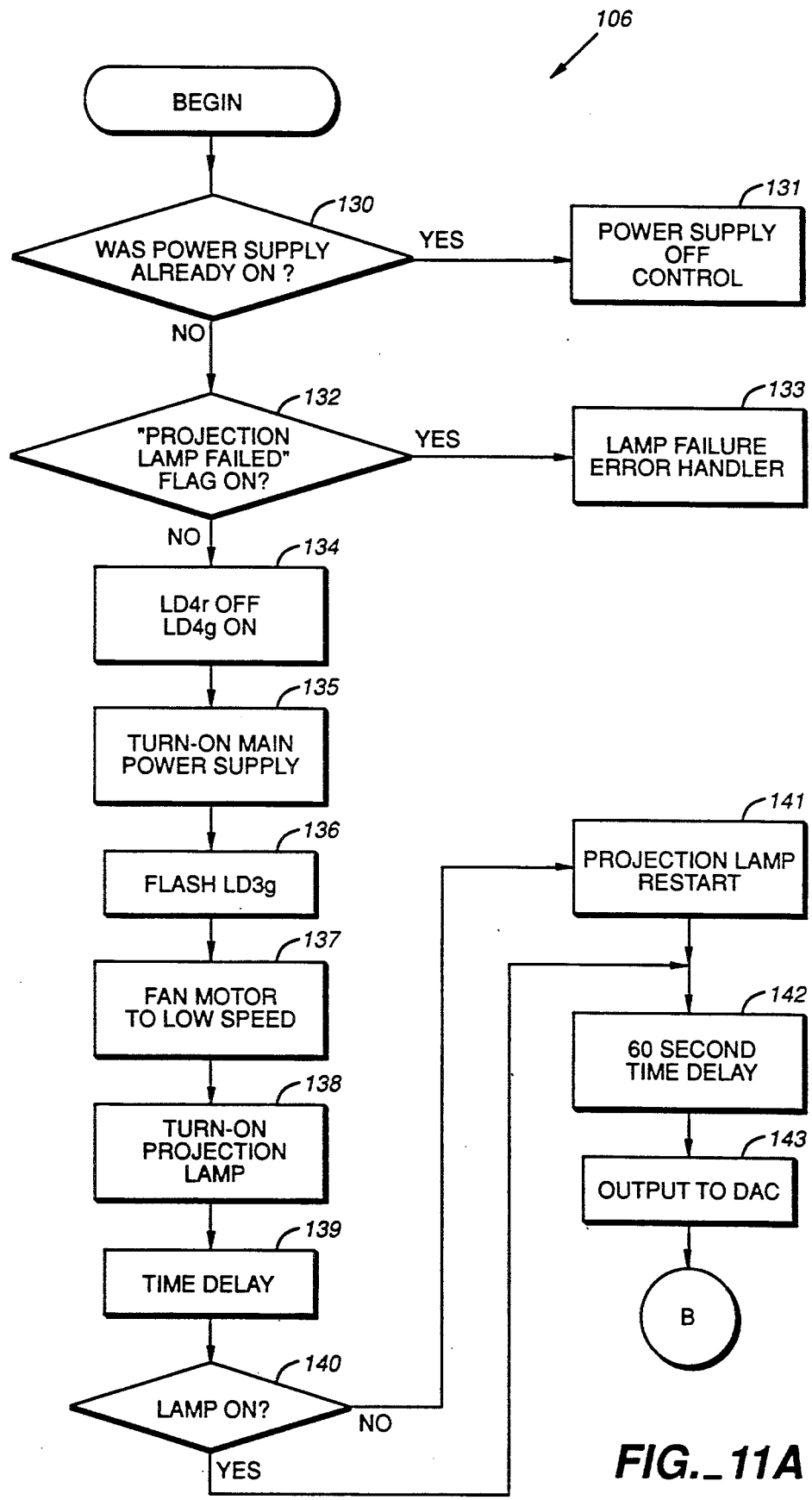
FIG._11A

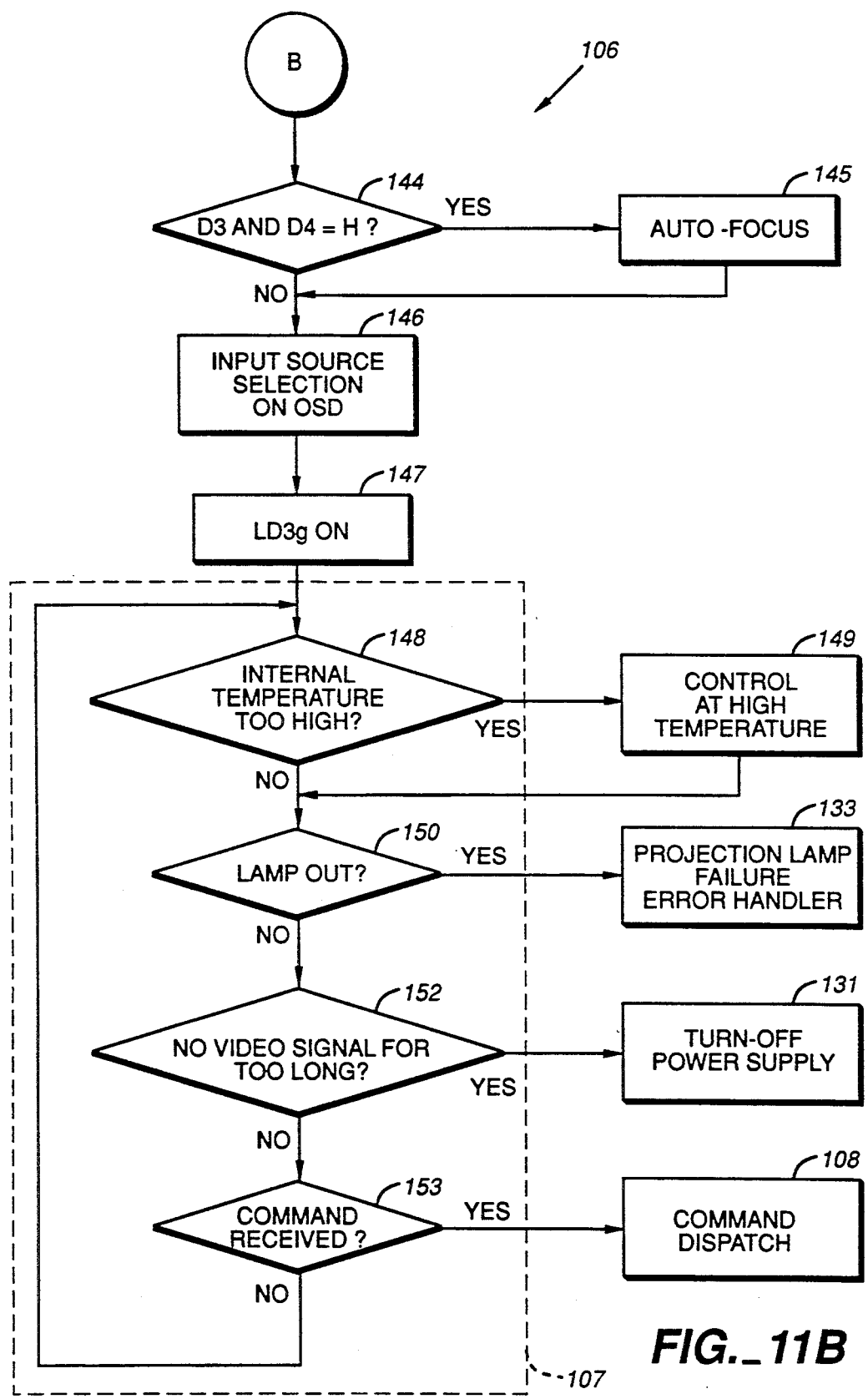
FIG._11B

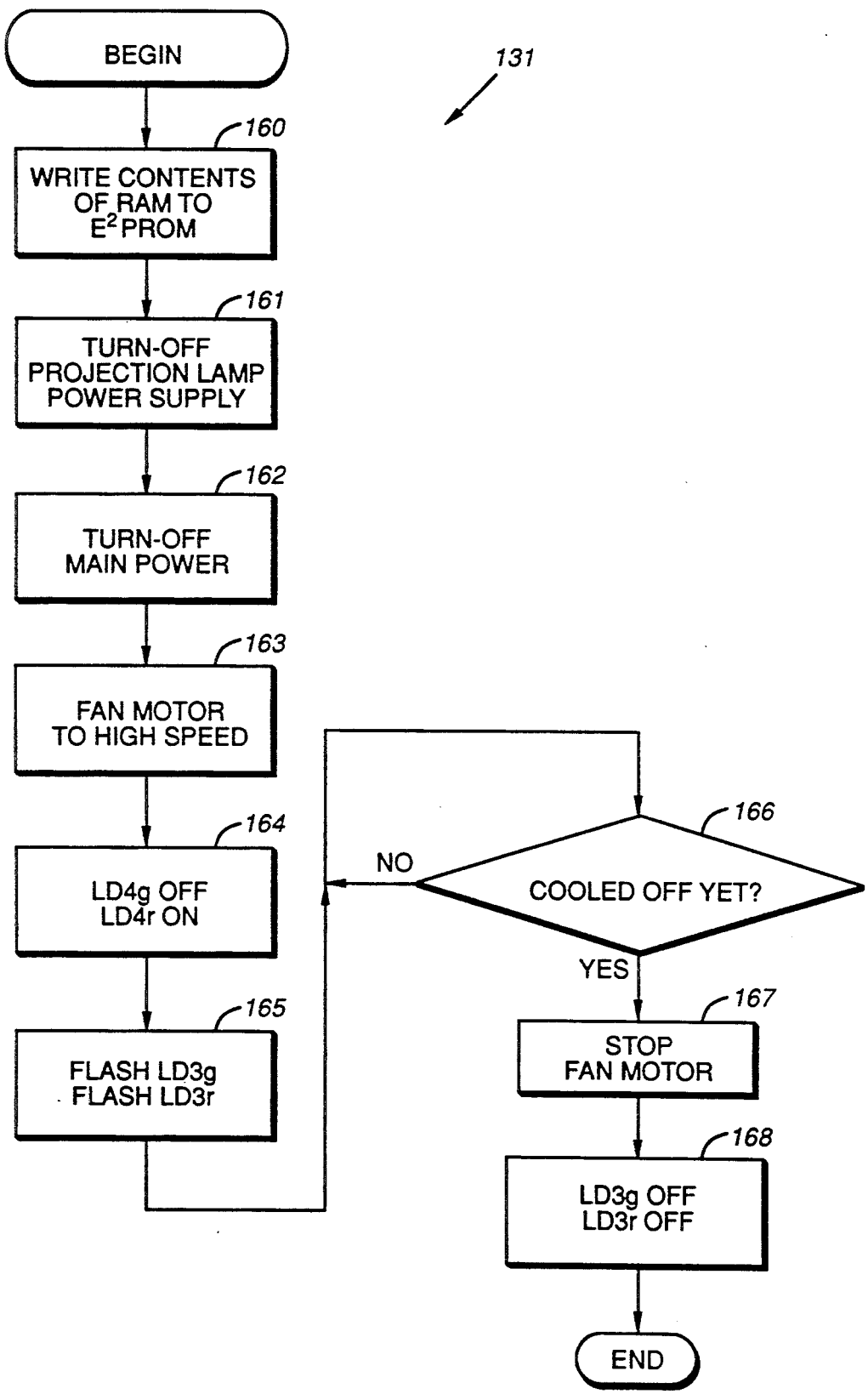
FIG._12

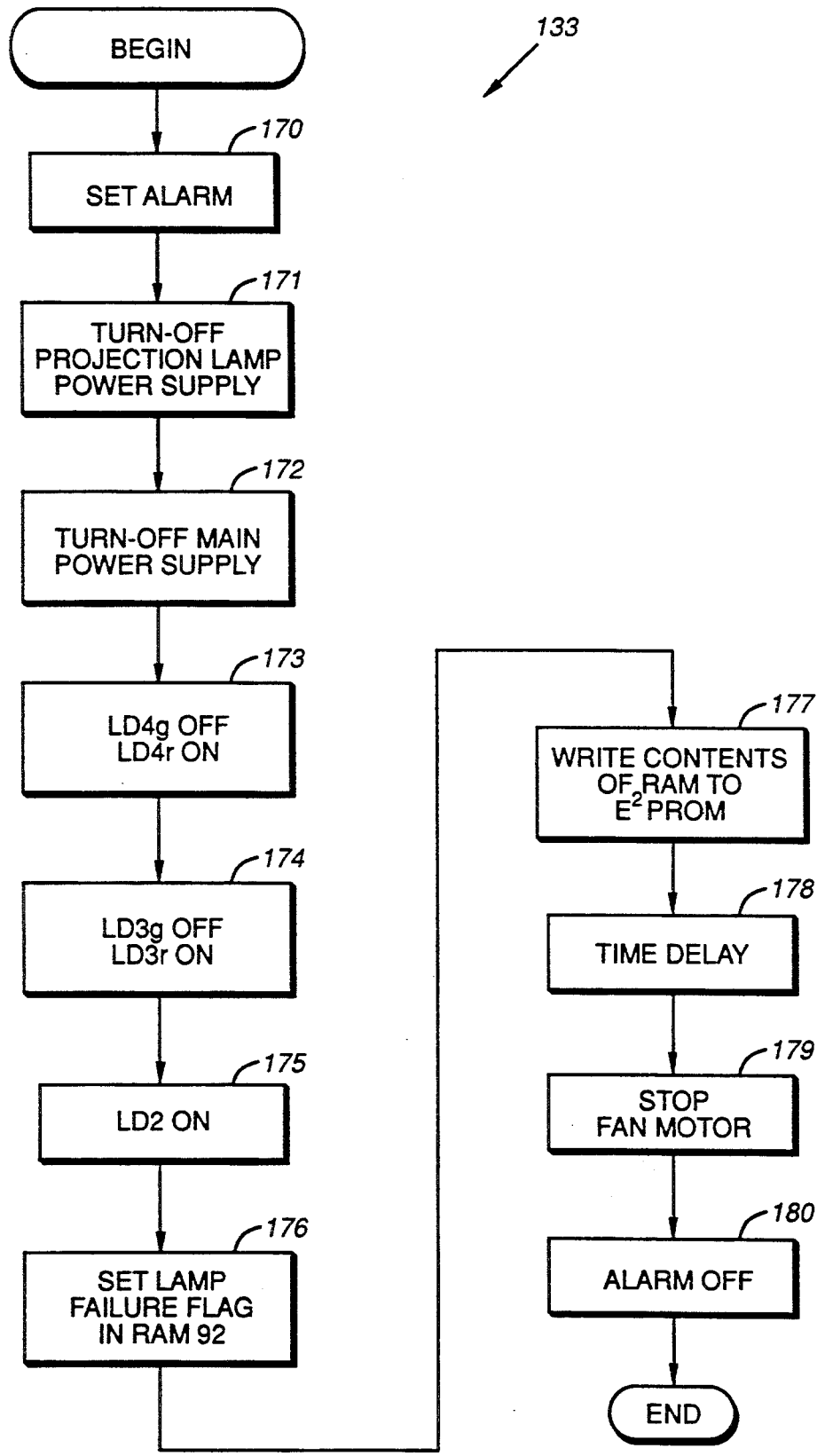
FIG._13

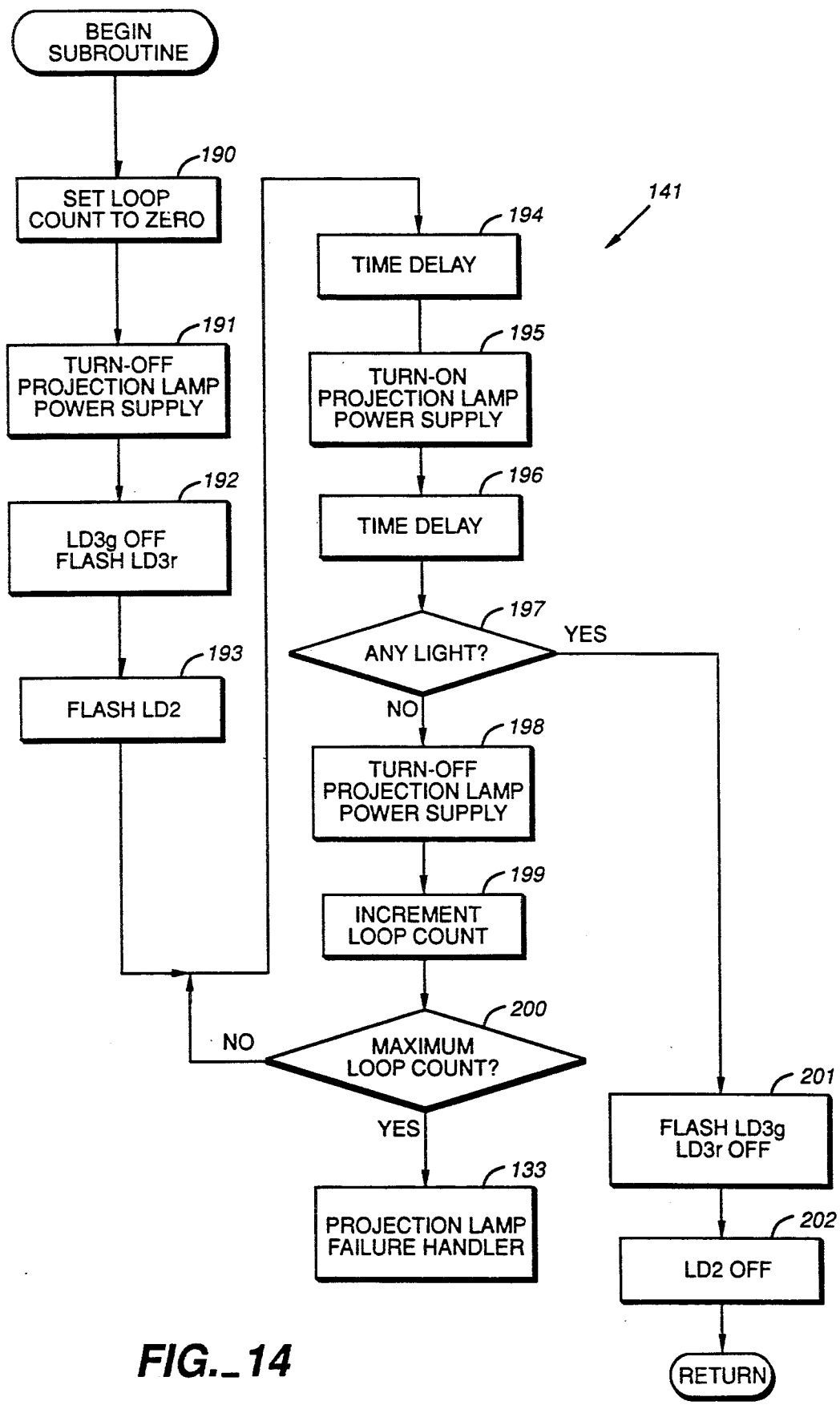
FIG._14

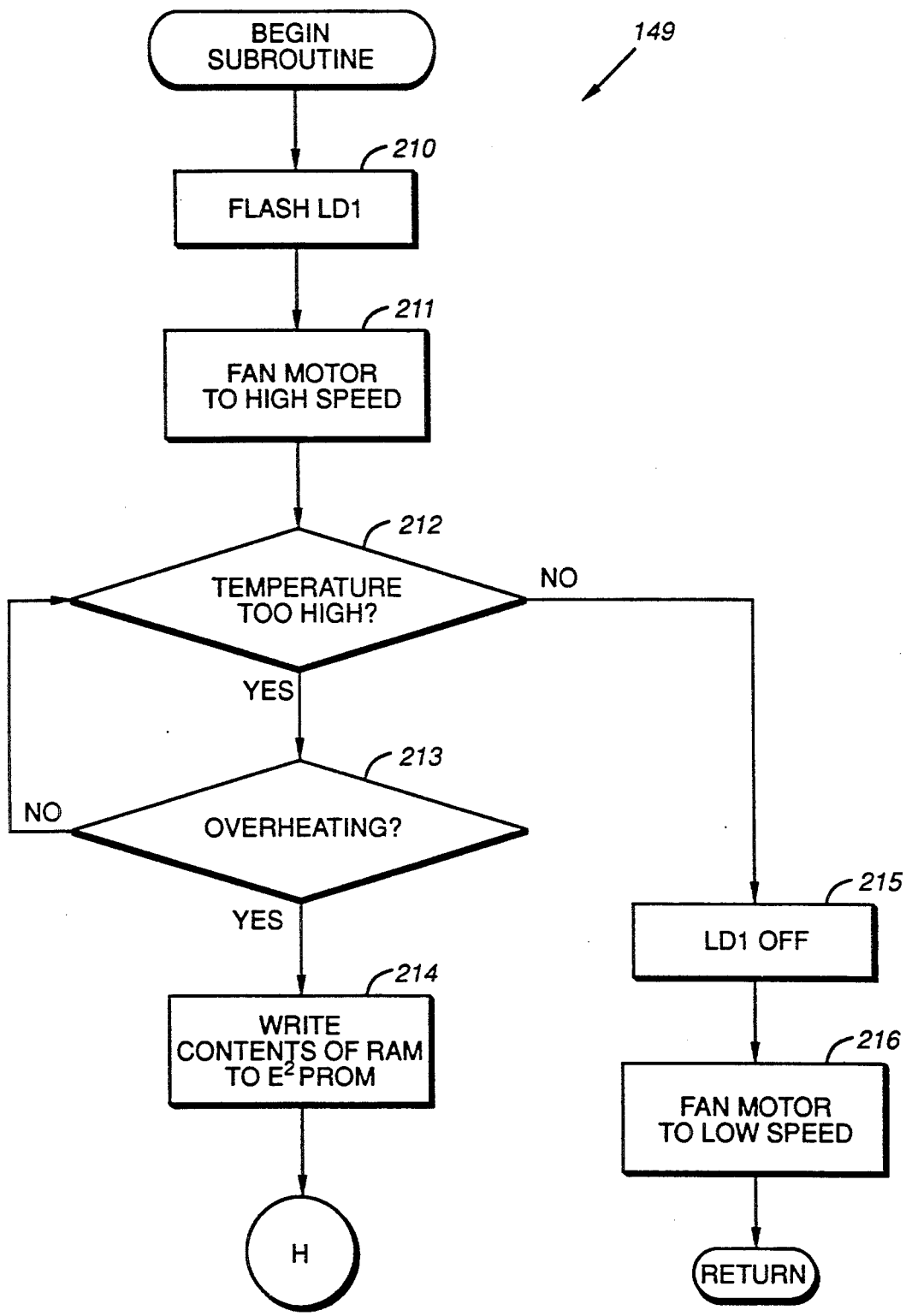
FIG._15A

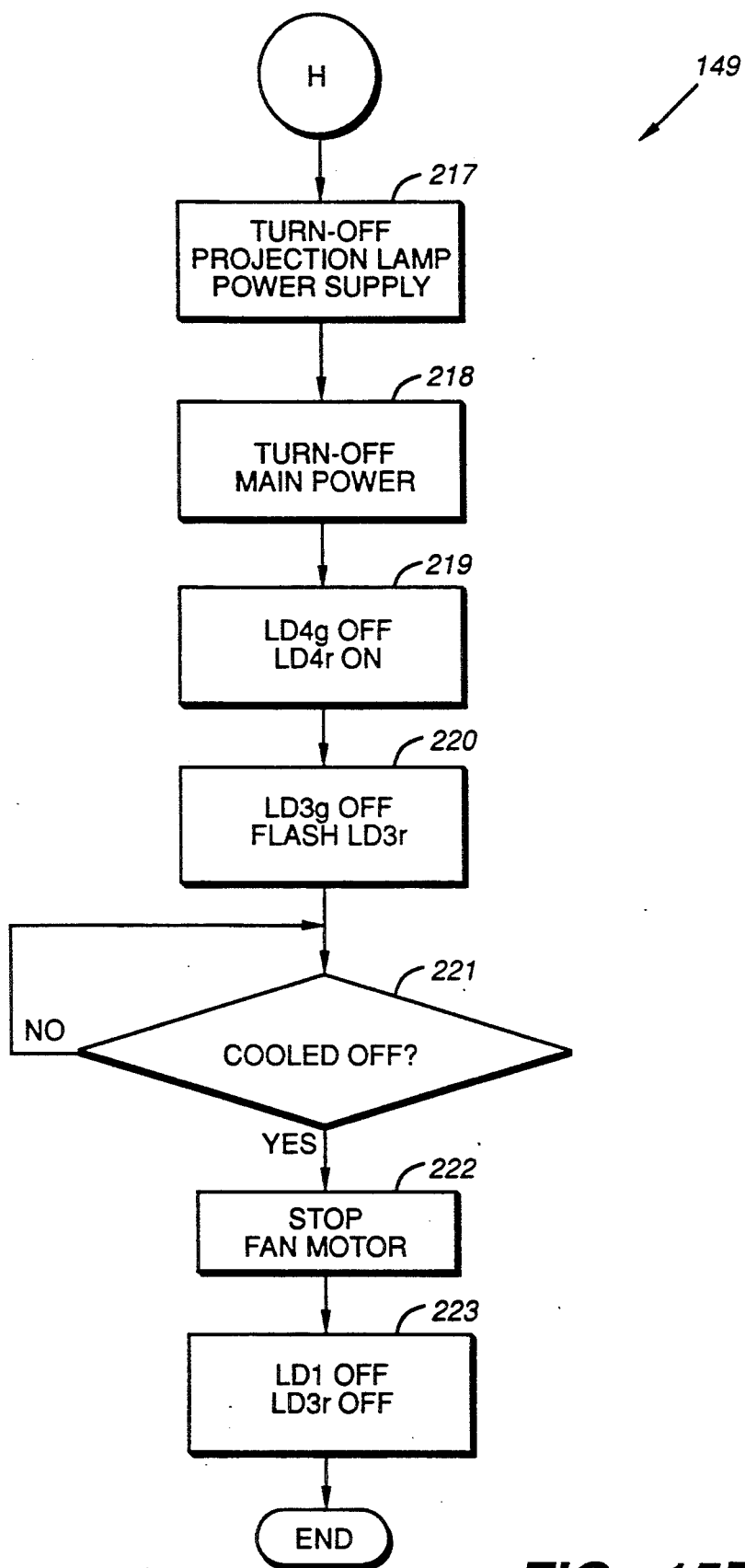
FIG._15B

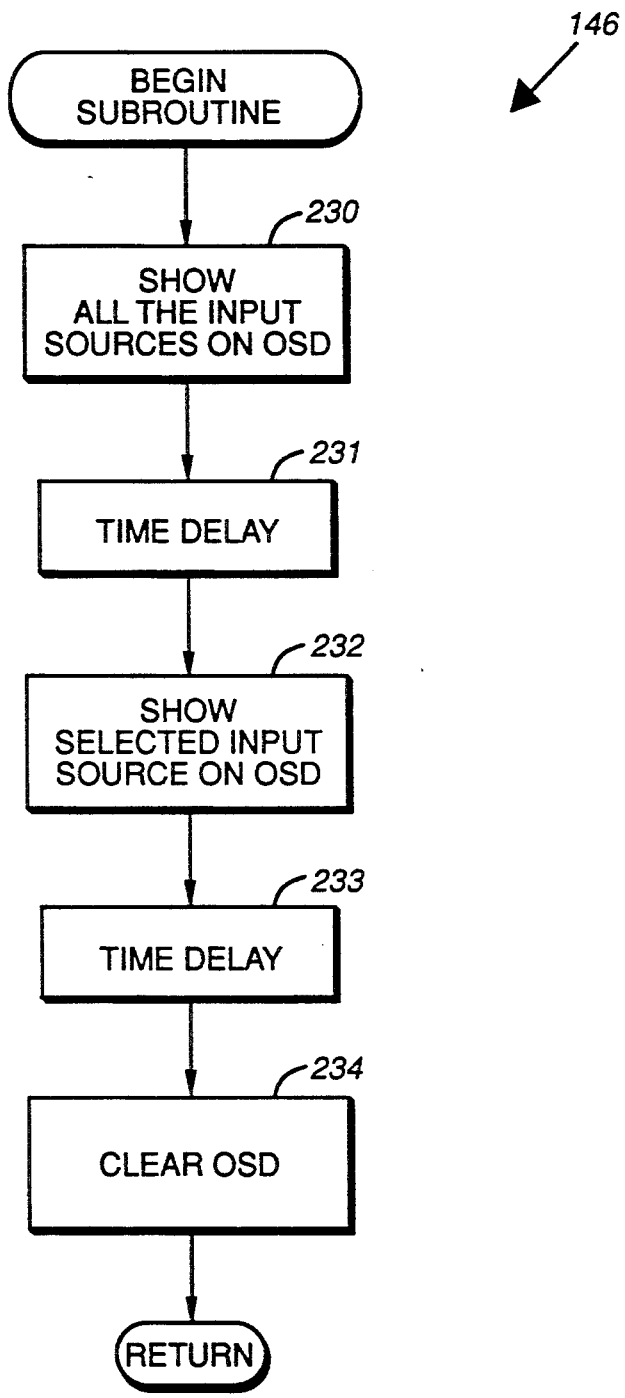
FIG._16

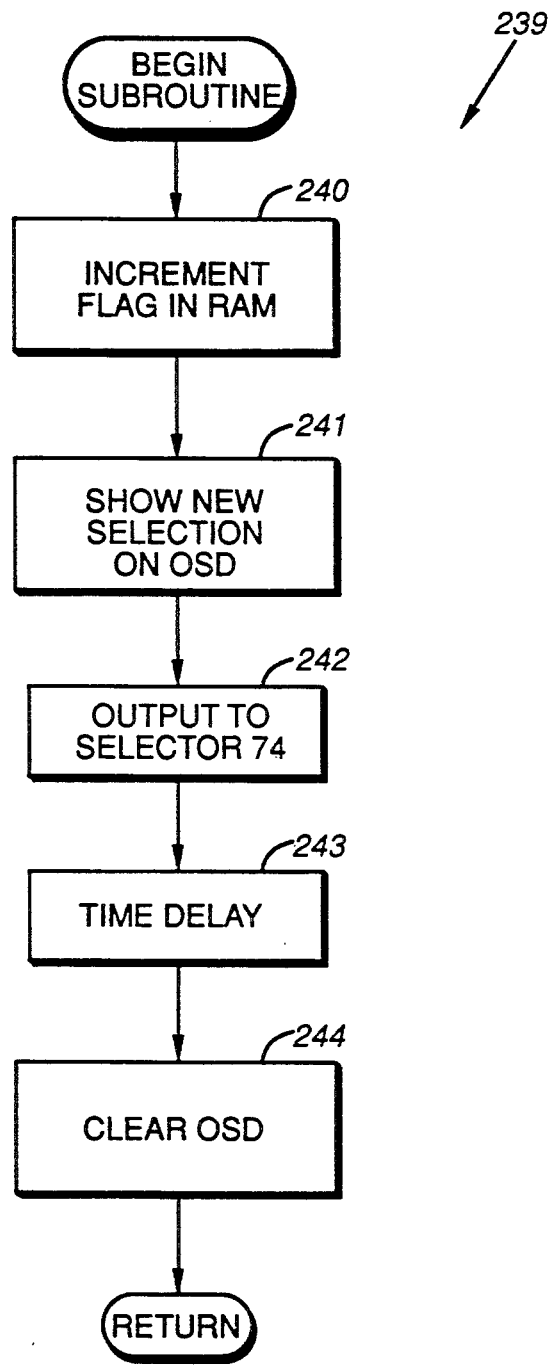
FIG._17

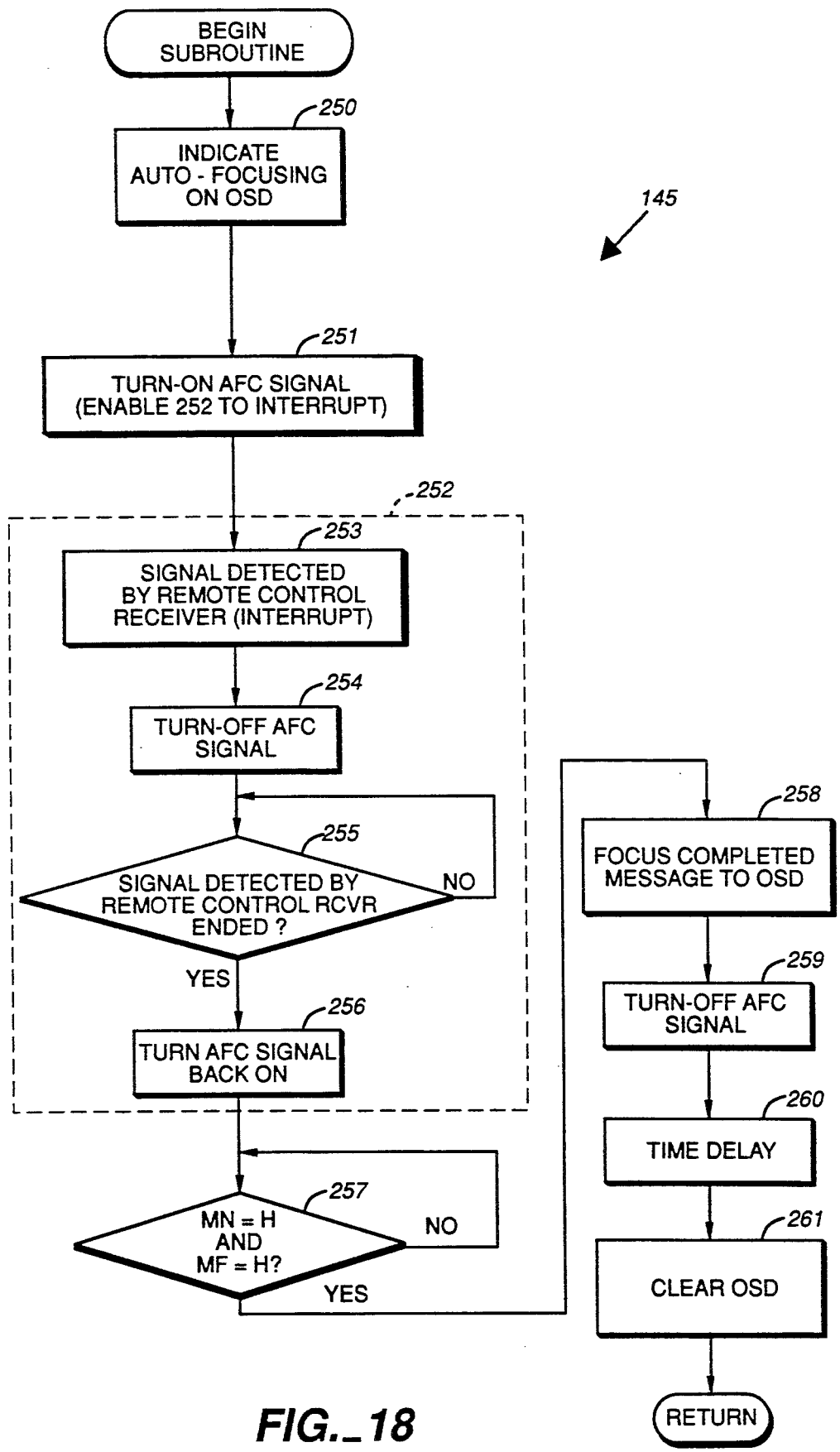
FIG._18

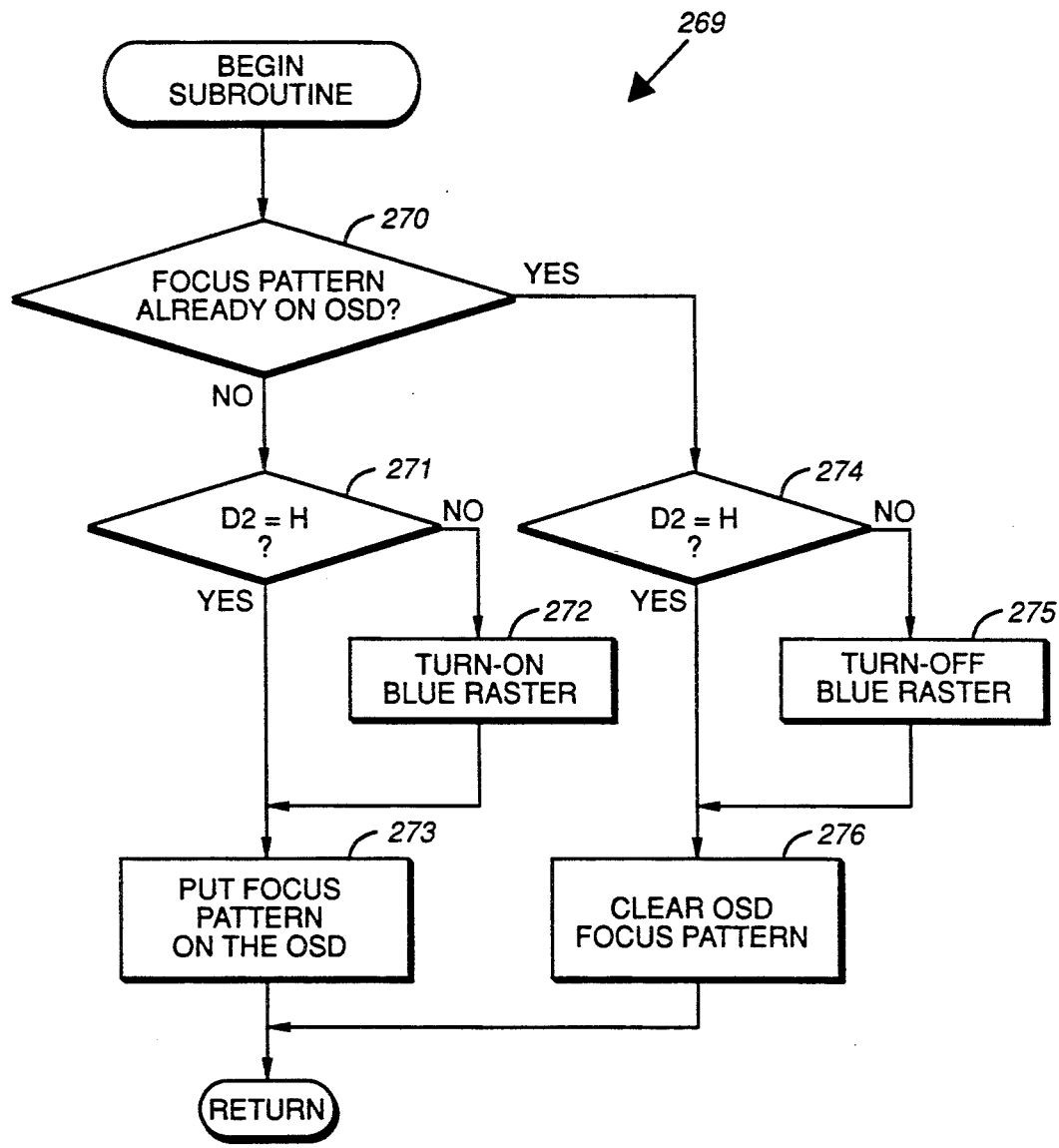
FIG._19

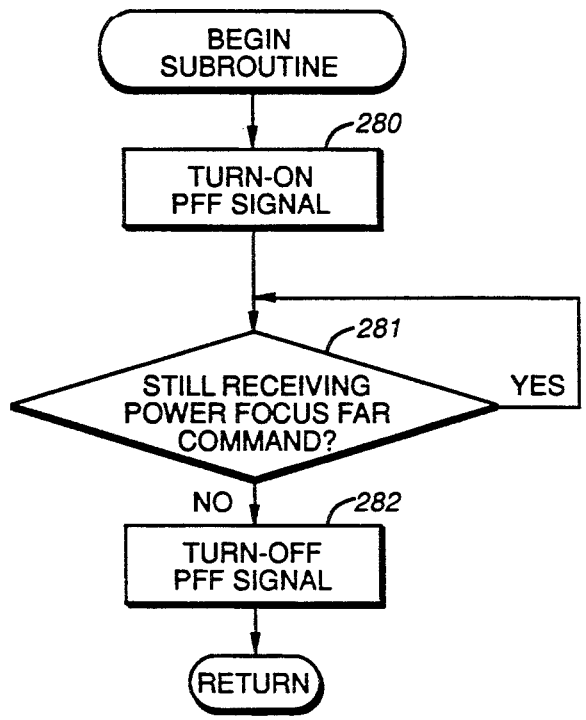
FIG._20
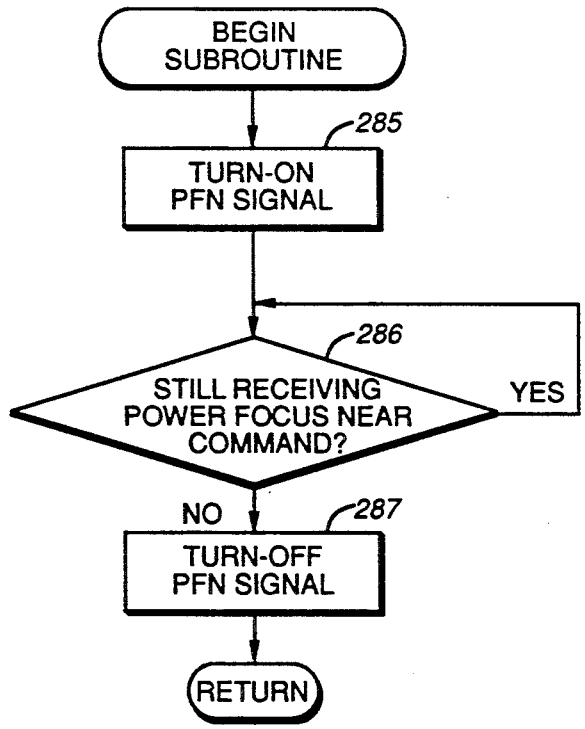
FIG._21

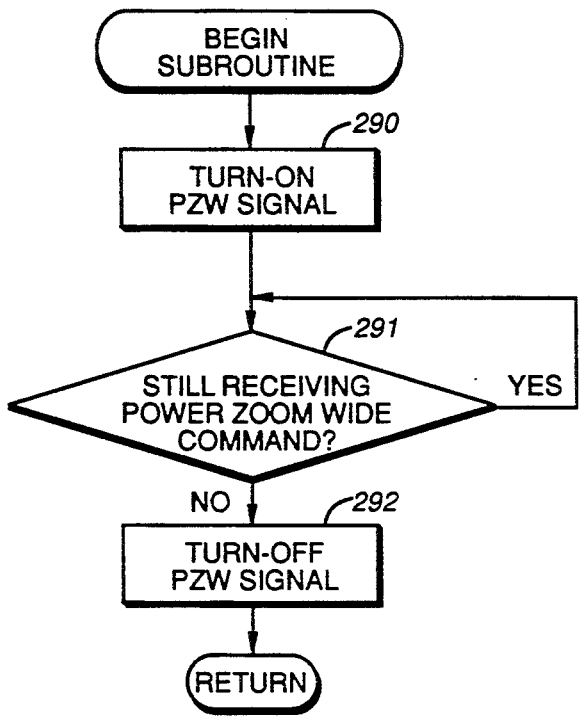
FIG._22
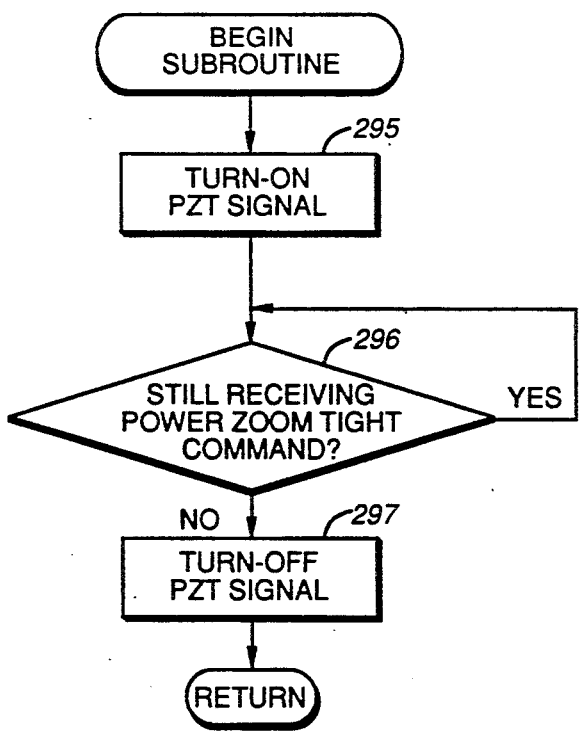
FIG._23

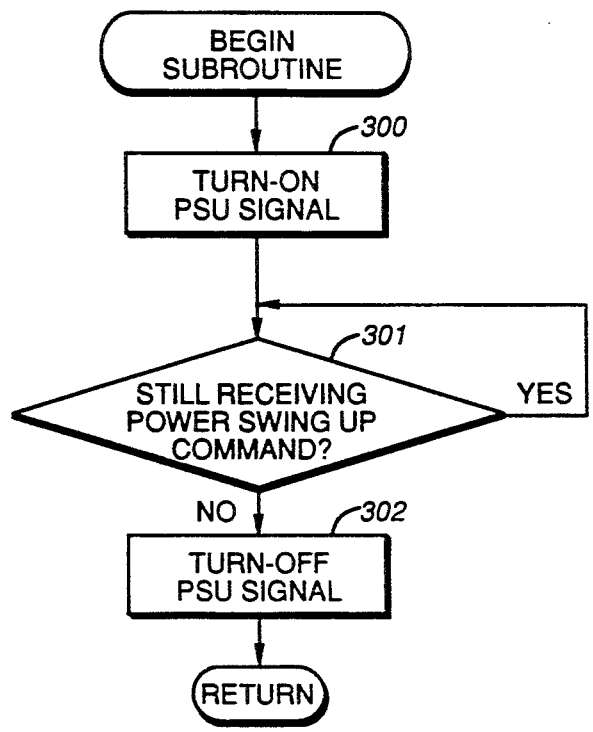
FIG._24
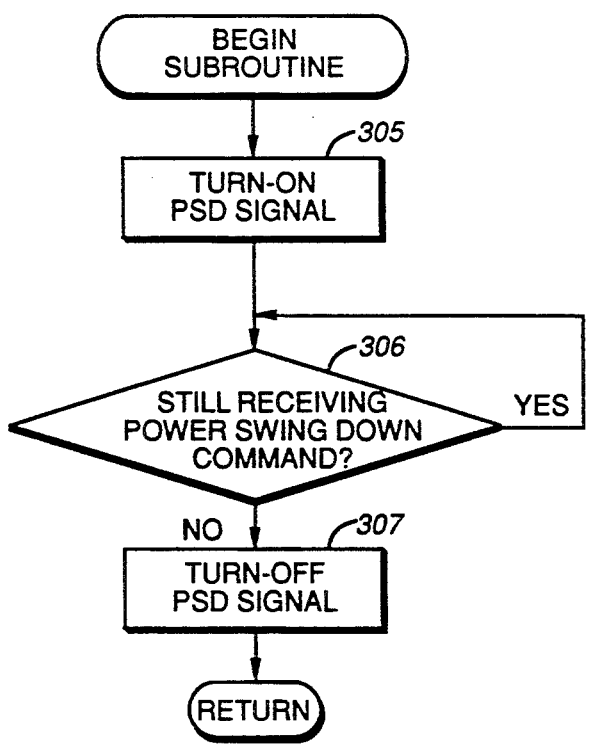
FIG._25

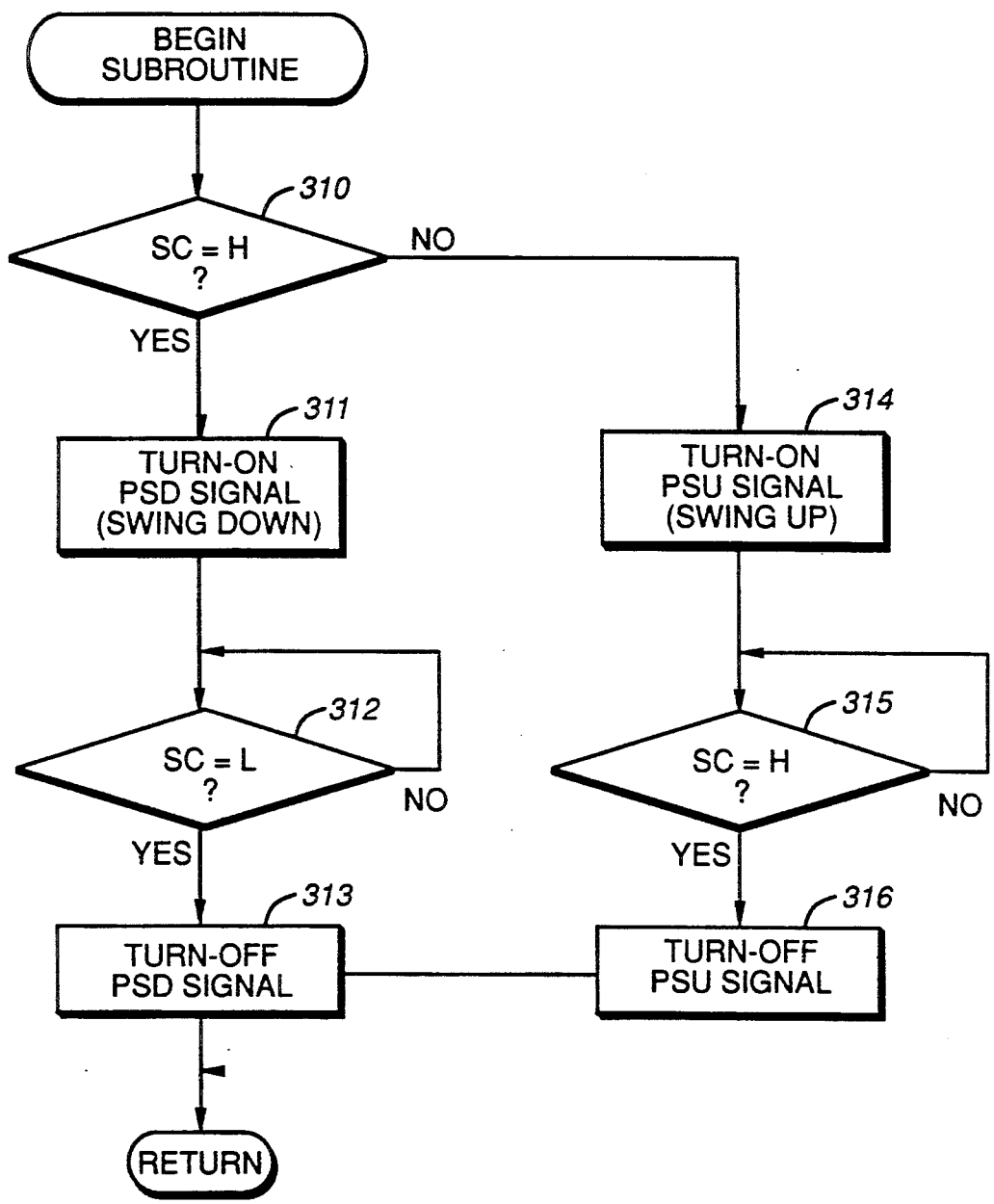
FIG._26

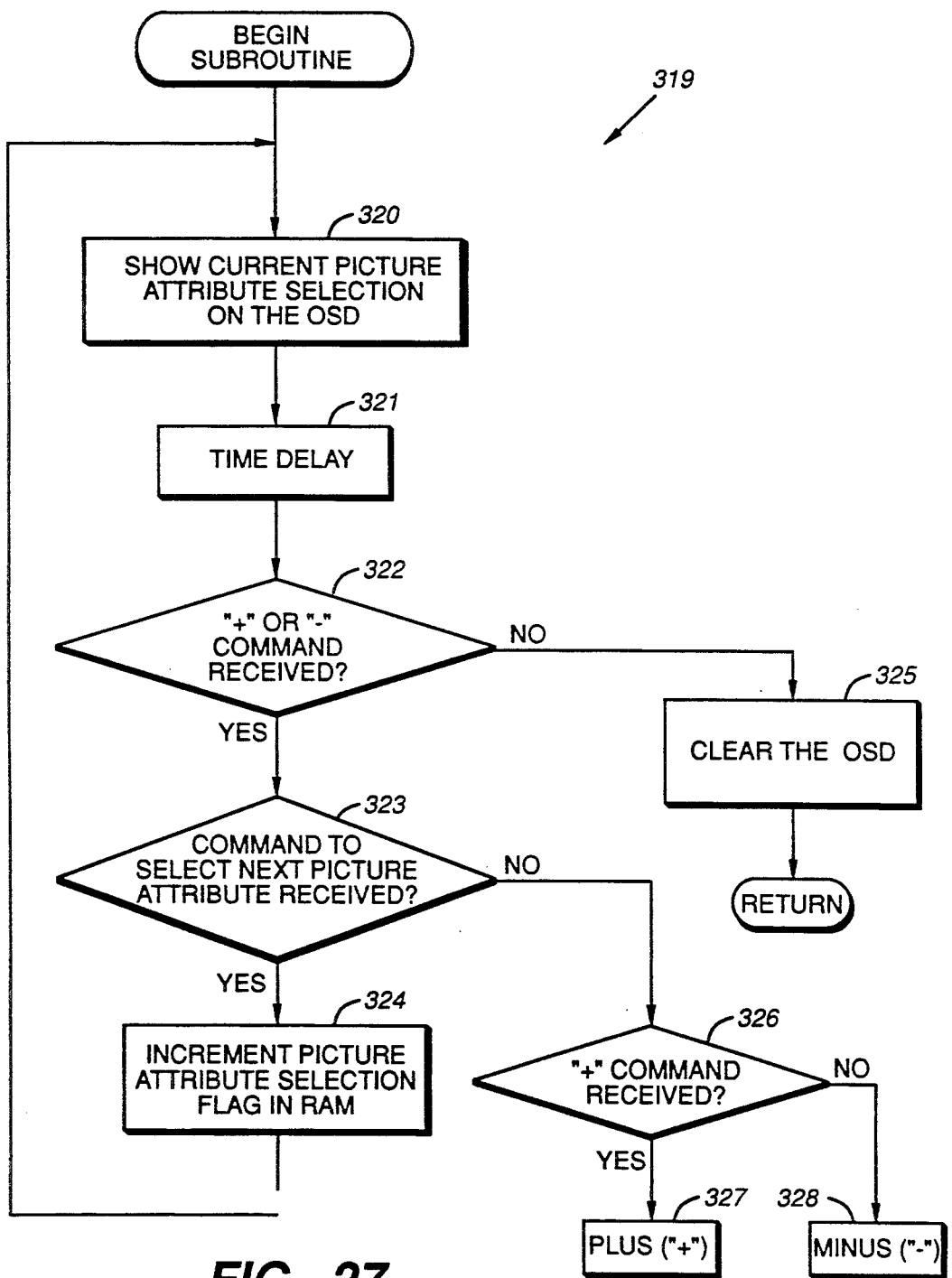
FIG._27

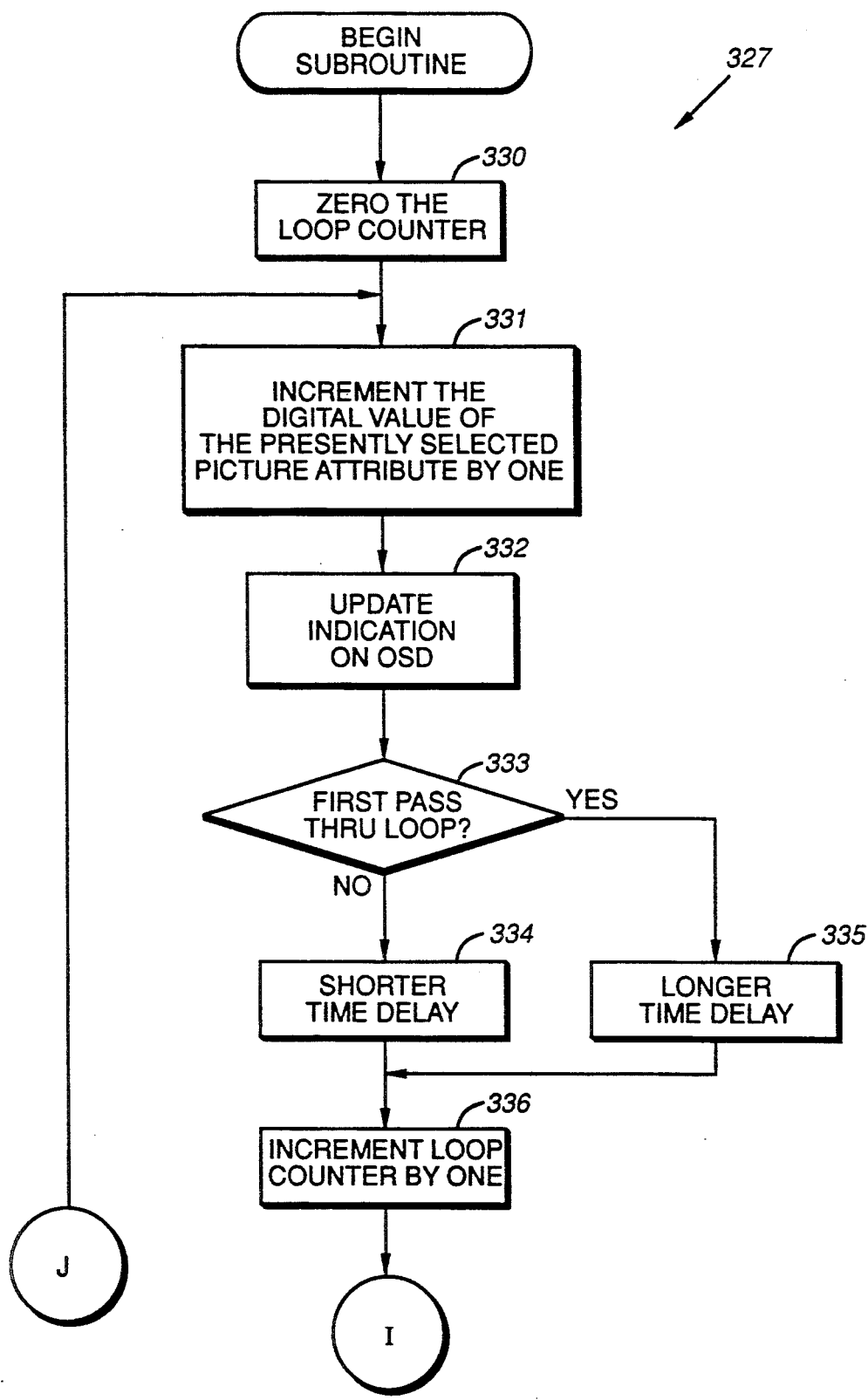
FIG._28A

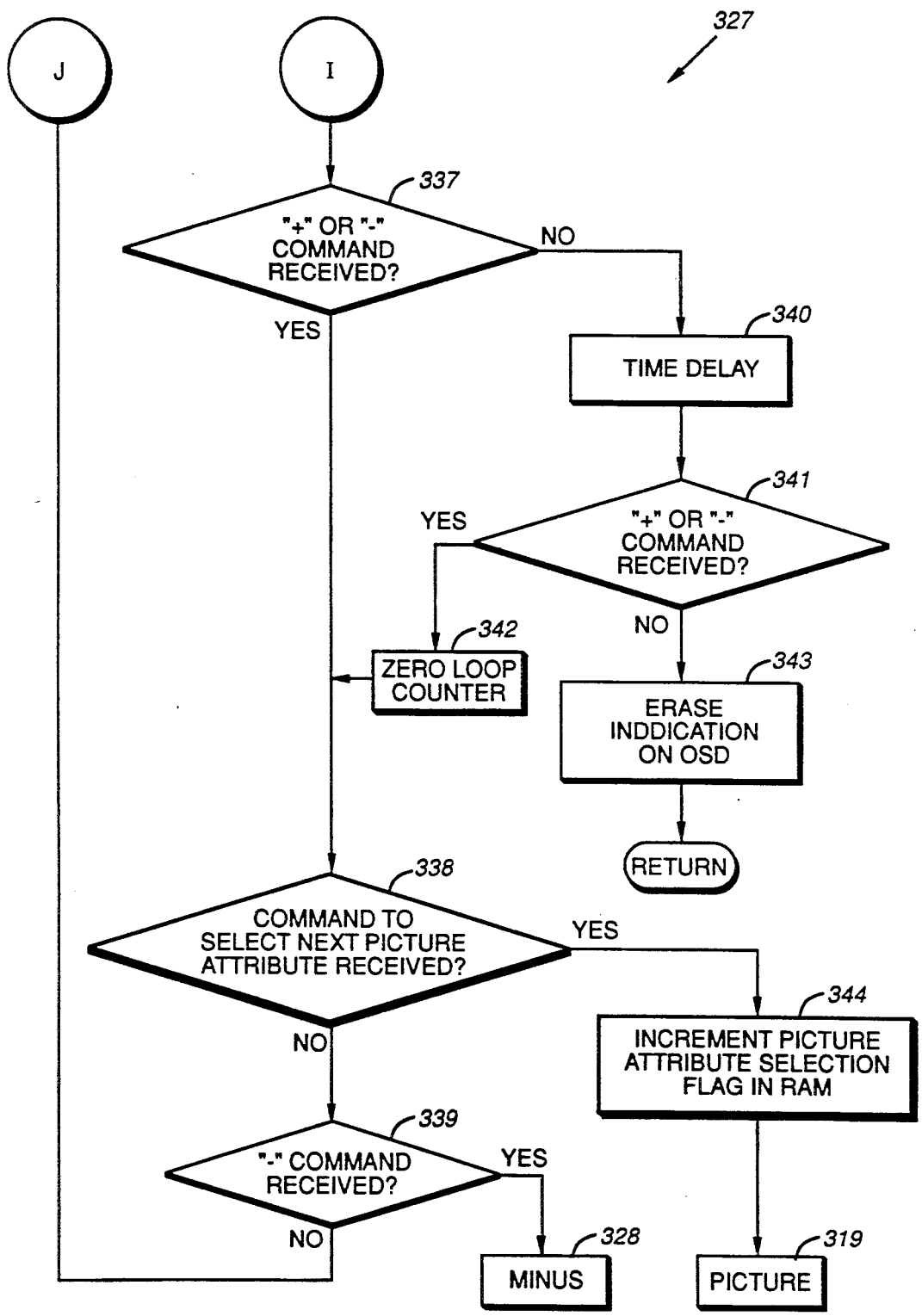
FIG._28B

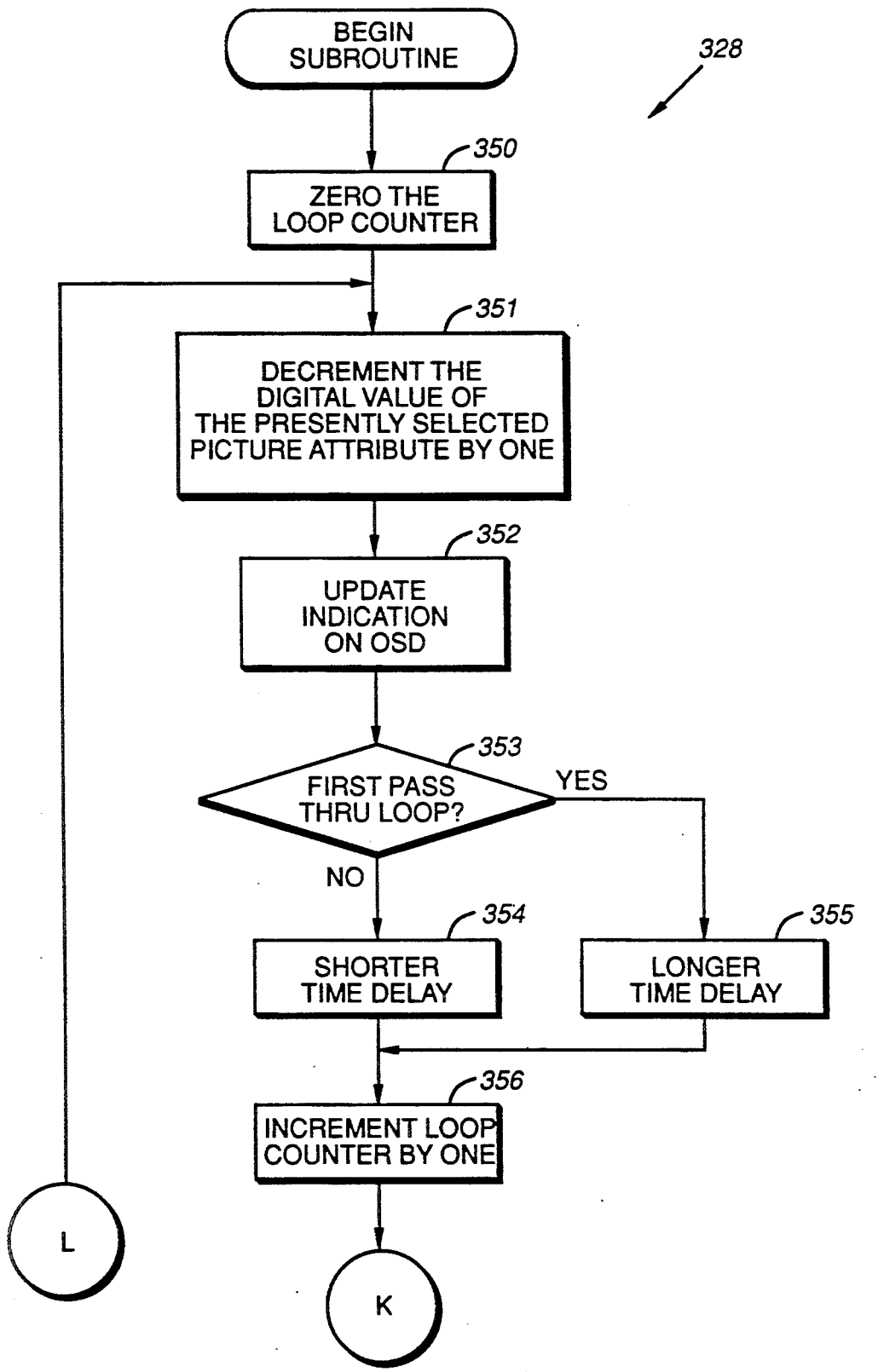
FIG._29A

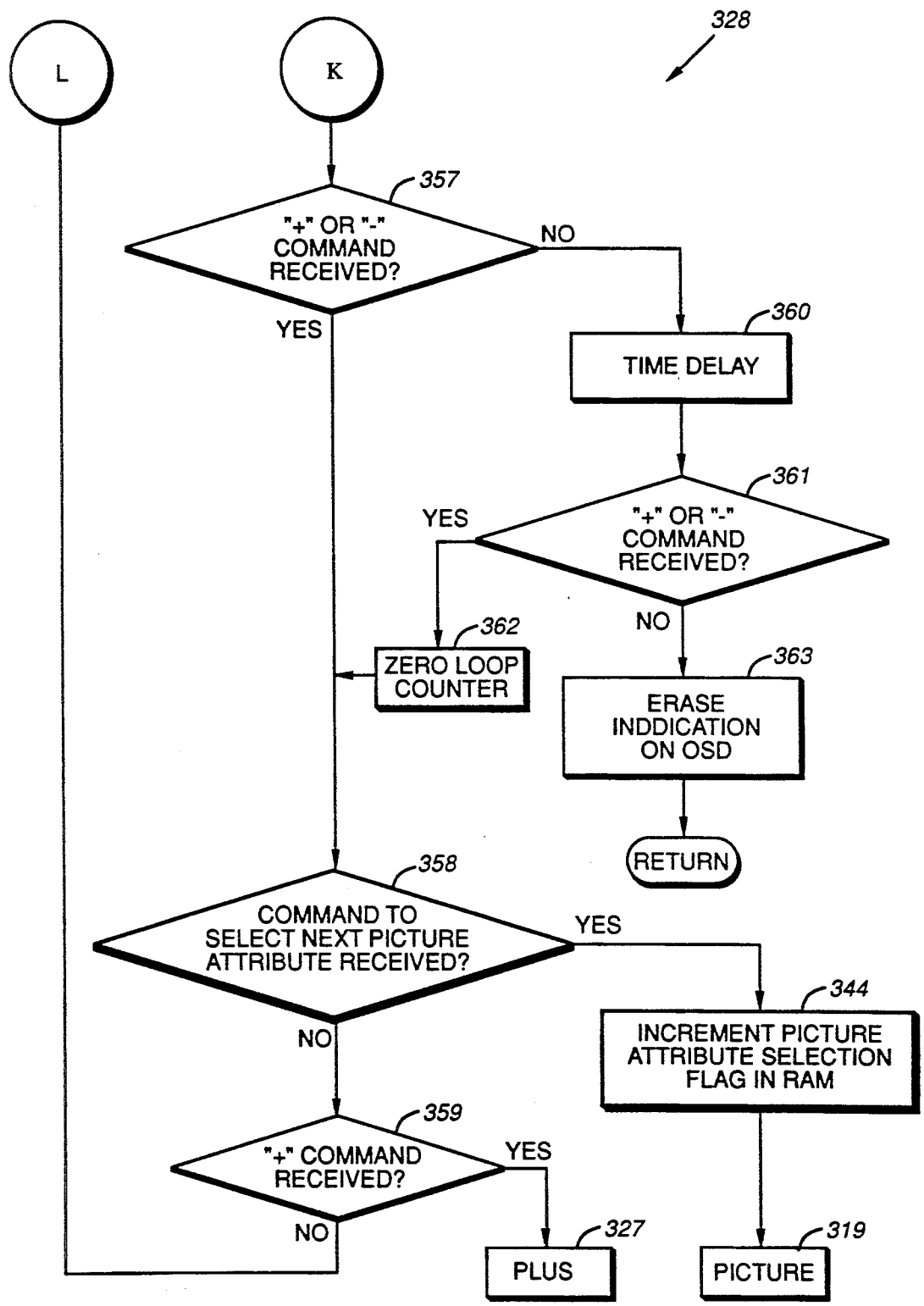
FIG._29B

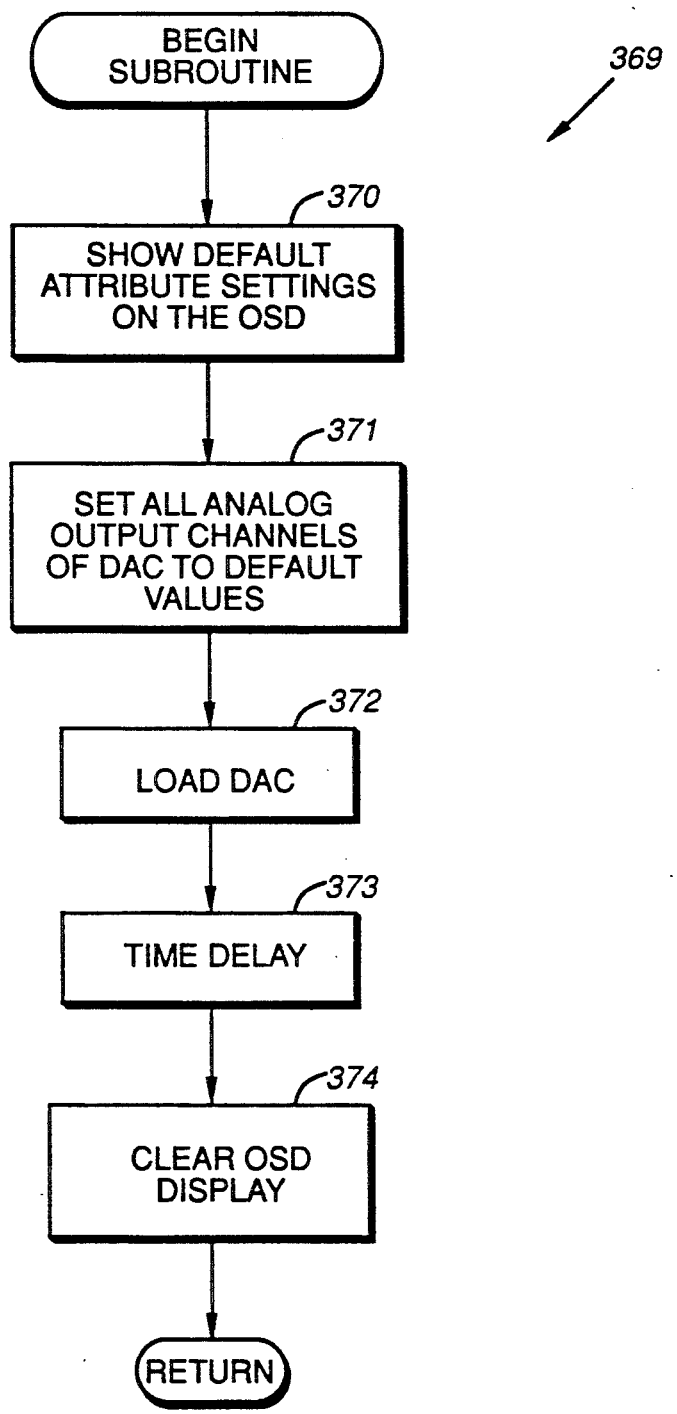
FIG._30

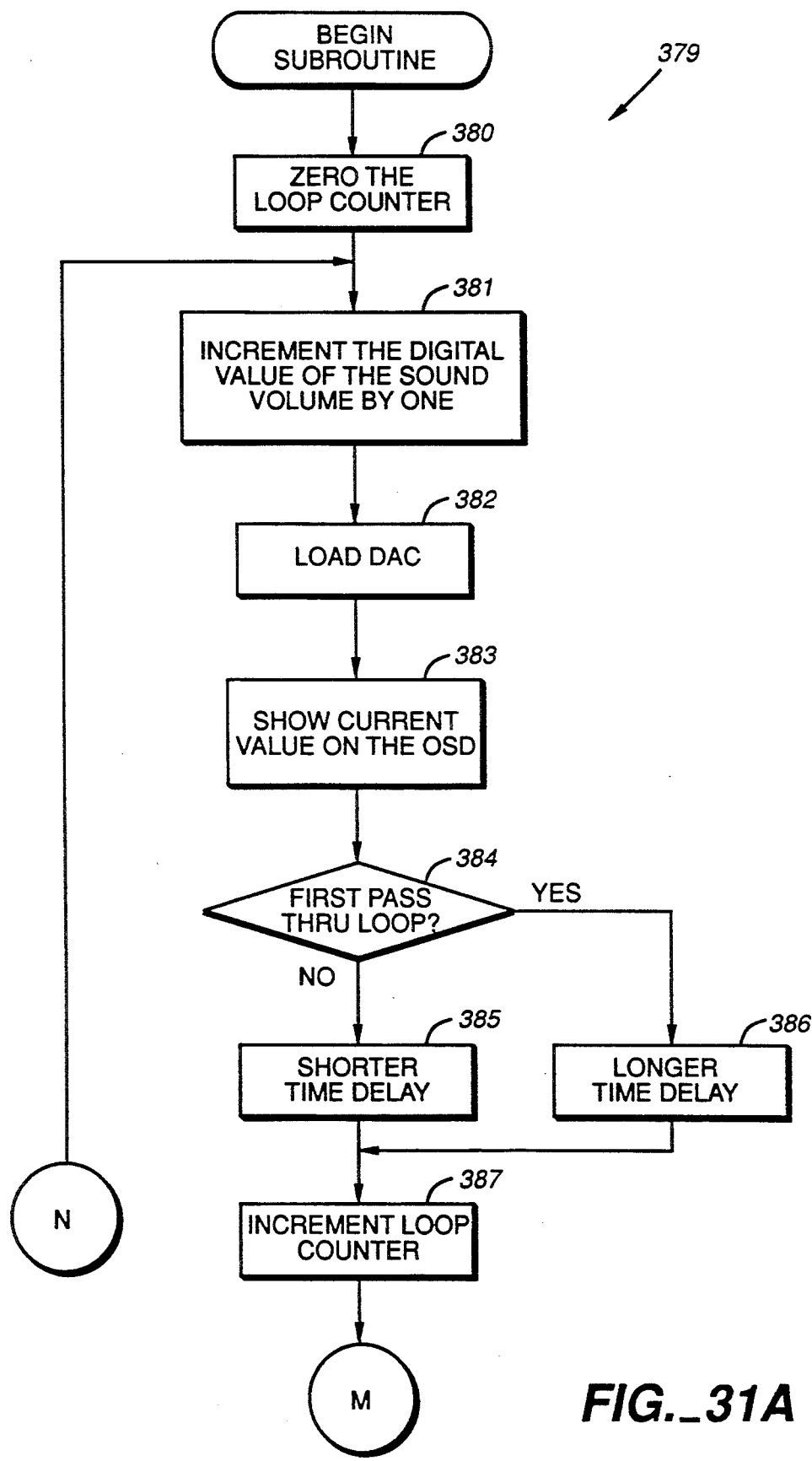
FIG._31A

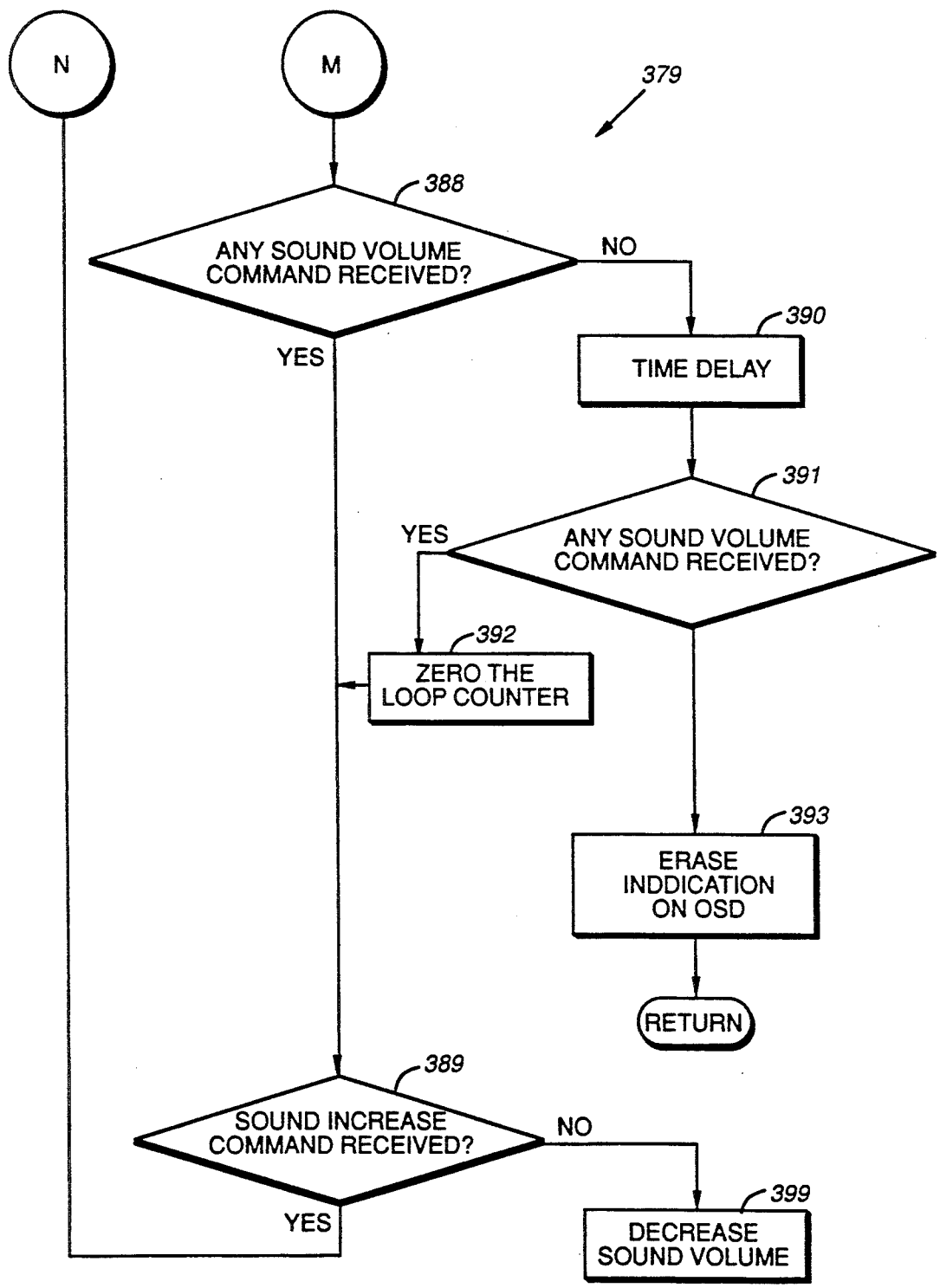
FIG._31B

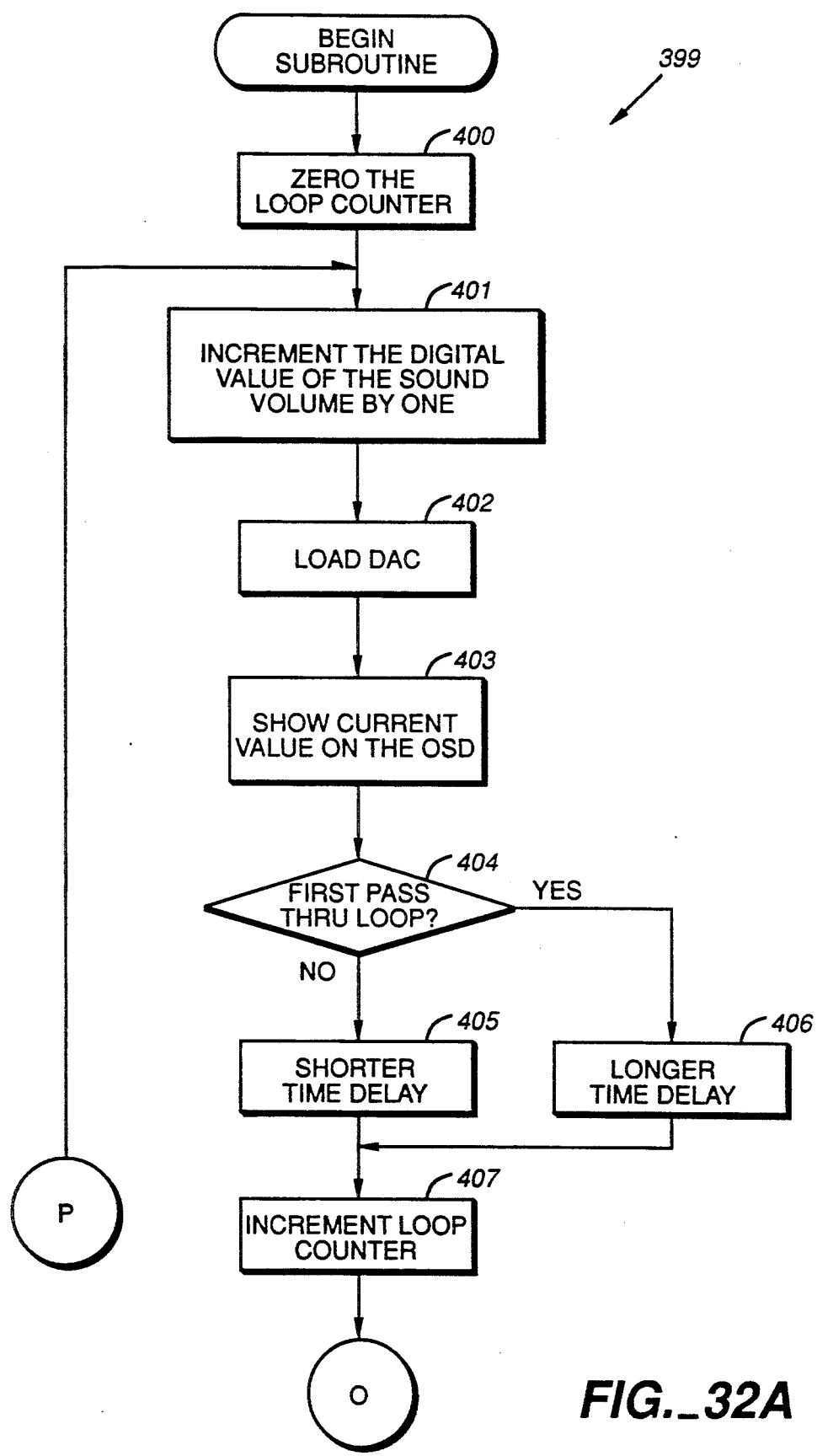
FIG._32A

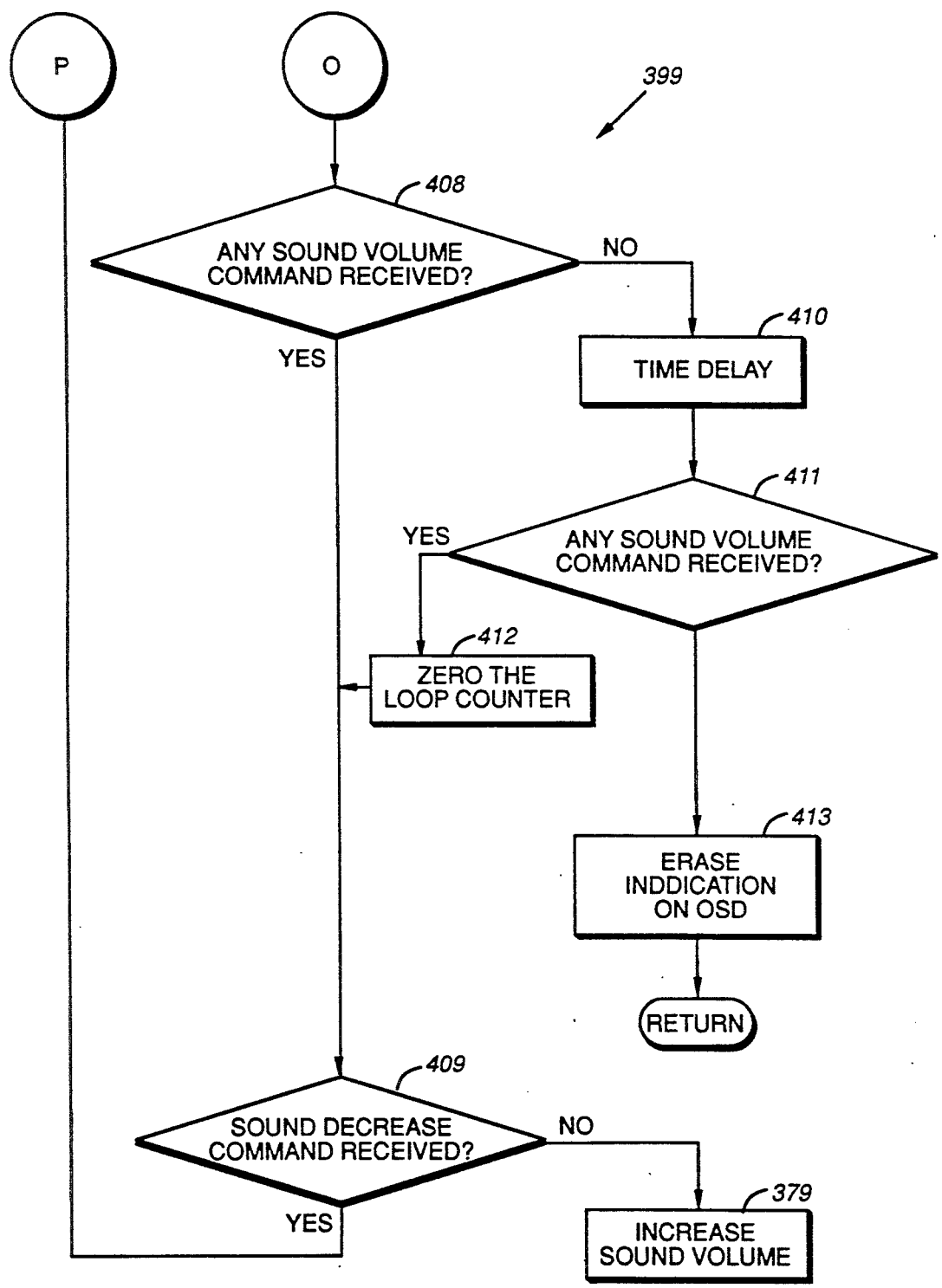
FIG._32B

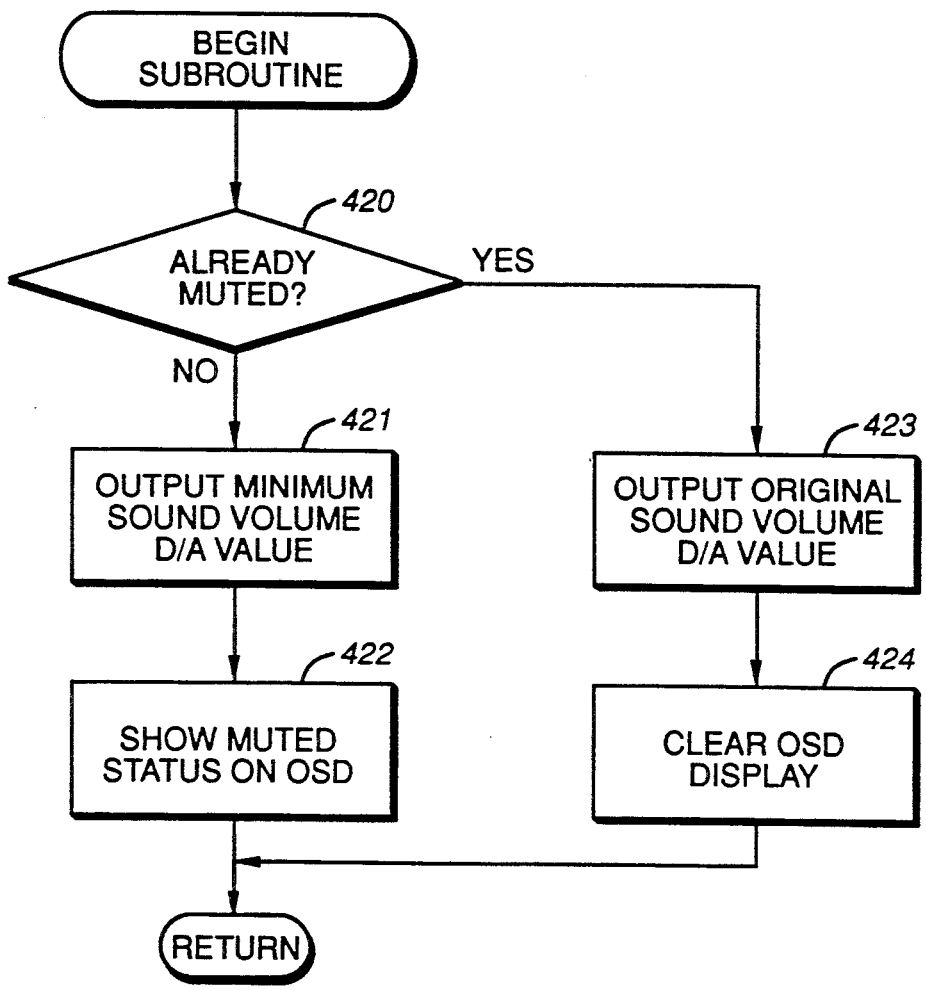
FIG._33

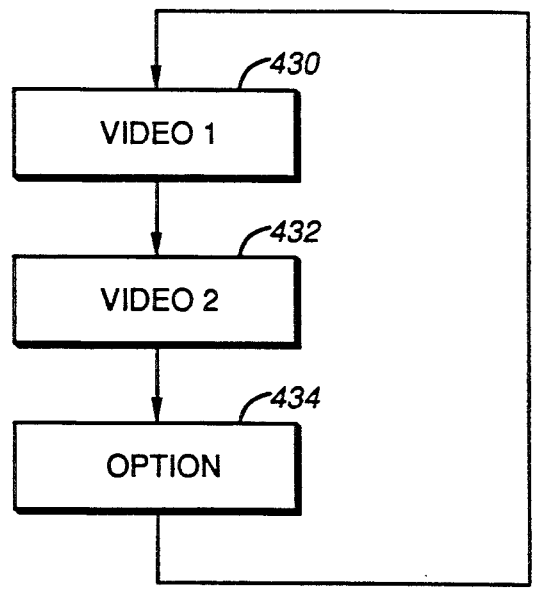
FIG._34
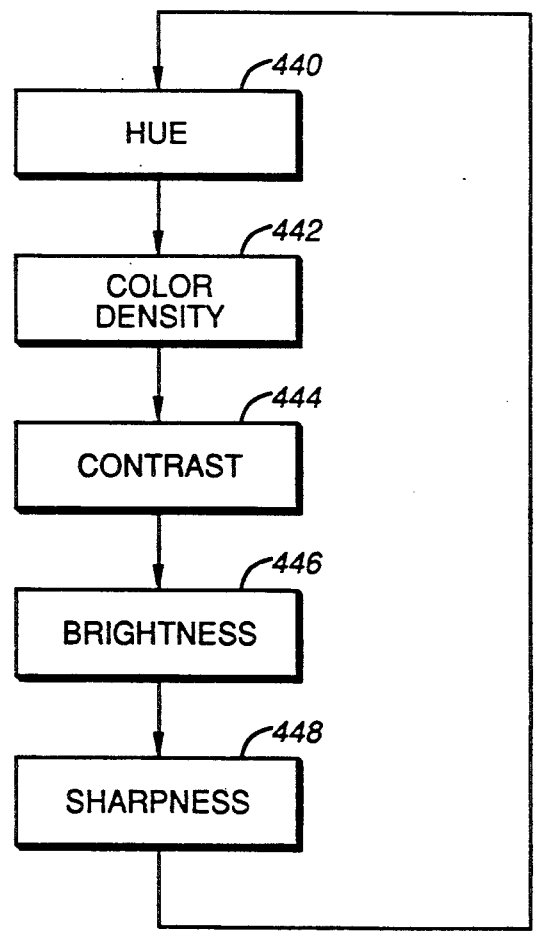
FIG._35

LIQUID CRYSTAL VIDEO PROJECTOR HAVING LAMP AND COOLING CONTROL AND REMOTE OPTICS AND PICTURE ATTRIBUTE CONTROLS

This is a continuation of copending application Ser. No. 07/605,292 filed Oct. 29, 1990 now abandoned.

BACKGROUND OF THE INVENTION

1. Field of the Invention

THis invention relates generally to video projectors, and more specifically to liquid crystal based video projection systems.

2. Description of the Prior Art

Large screen televisions presently employ three basic, alternative technologies. The first is large screen direct view cathode ray tubes (CRTs) reaching 35" (diagonal), the second is rear projection, and thr third is front projection on to a screen, much like the familiar movie projector. Direct view CRT screens larger than 35" are extremely expensive, and do not sell well into the consumer market as a result of the expense. Both rear and front projection television and video systems traditionally use CRTs. However, since the light produced by a CRT is coming from phosphorescence, the final light level is very limited by having to spread the light over an area up to ten times larger that the area of the CRT. One solution that has become very popular is to use three separate CRTs, one red, one green, and one blue. Monochrome CRTs can be forced to emit much more light than a single color CRT, because the electron shadow mask in back of the screen phosphors can be eliminated and far more electrons will strike the phosphors, which in turn produces more light. The three colors are then combined with lenses to form color images. And since the color image is the product of three very bright CRTs, the combination is as much as ten times brighter than was possible before. Even so, CRTs have limits, and new ways have been found to further increase projection light levels.

Liquid crystal panels, similar to LCD watches, emit no light on their own, but will block light shining through. In an LCD watch, a small light bolt is placed behind the LCD panel, and a switch will turn it on for viewing in the dark. In daylight, the LCD will reflect sunlight or indoor light and is very readable. Video projection systems using liquid crystal panels have begun to appear in commercial products sold in the United States, e.g. by Sharp Corporation (Japan). These systems typically place a high output metal halide lamp behind a liquid crystal panel with a video image and project that image up onto a screen using a system of lenses. An Oct. 1989 article by S. Kohzai, et al., describes a liquid crystal video projection system having a metal halide projection lamp, dichroic mirrors, three liquid crystal panels and associated lenses to produce full-color large-screen video. (*International Televison Engineering Journal* (ITEJ) Technical Report Vol. 13, No. 53, pp.49-54.)

Prior art video projection systems are typically constructed as is shown in FIG. 1. A video projection system referred to by the general reference numeral 10, is comprised of an on/off switch 12 connected to a power supply 14, a cooling fan 16, a projection lamp 18 with an over-temperature bimetal thermostat 20, a control module 22, an input module 24, a liquid crystal light valve 26, a lens unit 28, and a projection screen 29. Light from projection lamp 18 shines through an image formed on liquid crystal light valve 26 causing a projected image to be focussed by lens unit 28 on to screeen 29. The fan 16 forces cooling air through system 10, but whenever the airflow is blocked, system 10 will overheat as a result of the large amount of heat being dissipated internally by projection lamp 18. The over-temperature thermostat 20 is designed to trip at abnormally high heat and thus shut off the projection lamp 18. This action prevents damage to system 10 by oveheating. Airflow through system 10 can be inadvertently blocked and no warning that the thermostat 20 is about to trip is given. No outside indication is given that thermostat 20 has tripped off. A user could wrongly asume that the projection lamp 18 has burnt out and needs replacing.

The volume, picture, signal input, and lens settings of prior art projection systems usually require manual adjustment at the control module 22, via input module 24. This leads to inconvenience, because the positions of the screen, the video projector, and the user are normally several feet apart. Users must therfore move over to the projector system in order to adjust it. This will usually prohibit placing such projector systems out of reach, e.g., on the ceiling of a theater, bar, or restaurant.

SUMMARY OF THE INVENTION

According to this invention, a liquid crystal video projection system comprises a liquid crystal panel with a video image, a projection lamp with ON/OFF control, a zoom lens with a zoom control mechanism, a focus lens with a focus control mechanism, an audio system with volume control, a projection-lamp light detector, a heat sensor, a variable-speed cooling fan, a control module having a microprocessor, a display, a keypad, an alarm/annunciator, a power supply with ON/OFF control, and an infrared based remote control system.

An advantage of the present invention is that there is improved overheating protection with indicators that assist a user in averting trouble before failure occurs, and means to quickly troubleshoot or respond to a problem once the problem has been identified.

A further advangage of the present invention is that remote adjustment of the system can be made from the normal viewing position of the user relative to the system. THe projected image can be remotely focused, zoomed in and out, and moved up or down on the projection screen.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 2 is a functional block diagram of a liquid crystal video projector (LCVP) embodiment that incorporates the present invention;

FIG. 3 is a block diagram of an alternate microprocessor-based embodiment of a portion of the LCVP in FIG. 2;

FIG. 4 is a schematic diagram of the input unit showing details of the command pushbutton switch matrix and option toggle switches;

FIG. 5 is a schematic diagram of the main power and projection lamp power controllers and the light and temperature detectors;

FIG. 6 is a block diagram showing the interfacing details for the signal input source selector, E²PROM memory, lens controller, and the DAC connections to the I/O port;

FIG. 7 is a schematic diagram of the display LED interfaces and a block diagram representation of the on-screen display (OSD);

FIG. 8 is a schematic diagram of the variable speed fan controller and the alarm;

FIG. 9 is a flowchart of an exemplary "top-level" control program.

FIGS. 10A and 10B are flowcharts of a subroutine that does power-on initialization housekeeping duties;

FIGS. 11A abnd 11B are flowcharts of a main power and projection lamp start-up subroutine;

FIG. 12 is a flowchart of a subroutine to orderly shut down the main power and projection lamp power;

FIG. 13 is a flowchart of a subroutine to handle a failure of the projection lamp;

FIG. 14 is a flowchart of a subroutine to restart the projection lamp;

FIGS. 15A and 15B are flowcharts of a subroutine to respond to an over-temperature condition;

FIG. 16 is a flowchart of a subroutine to display the current signal input source selection on the on-screen display;

FIG. 17 is a flowchart of a subroutine to step the signal input source selection to the next source and to display the activity on the on-screen display;

FIG. 18 is a flowchart of a subroutine to automatically focus the LCVP together with an interrupt subroutine to temporarily disable the auto-focus:

FIG. 19 is a flowchart of a subroutine to toggle a display of a focusing target pattern on and off the projection screen;

FIG. 20 is a flowchart of a subroutine to drive focue out (far) during a command from the remote control transmitter;

FIG. 21 is a flowchart of a subroutine to drive focus in (near) during a command from the remote control transmitter;

FIG. 22 is a flowchart of a subroutine to zoom wider during a command from the remote control transmitter;

FIG. 23 is a flowchart of a subroutine to zoom tighter during a command from the remote control transmitter;

FIG. 24 is a flowchart of a subroutine to drive the angle of the lenses such that the projected image is moved up on the projection screen;

FIG. 25 is a flowchart of a subroutine to drive the angle of the lenses such that the projected image is moved down on the projection screen;

FIG. 26 is a flowchart of a subroutine to automatically center the up and down position of the projected image;

FIG. 27 is flowchart of a subroutine to allow the selection and adjustment of a plurality of picture attributes (e.g., brightness, color, and hue);

FIGS. 18A and 28B are flowcharts of a subroutine to increment a picture attribute selected in the subroutine of FIG. 27;

FIGS. 29A and 29B are flowcharts of a subroutine to decrement a picture attribute selected in the subroutine of FIG.27;

FIG. 30 is a flowchart of a subroutine to set all the picture attributes to a default value;

FIGS. 31A and 31B are flowcharts of a subroutine to increase sound volume;

FIGS. 32A and 32B are flowcharts of a subroutine to decrease sound volume;

FIG. 33 is a flowchart of a subroutine to toggle (sound) mute on and off;

FIG. 34 shows the rotation of choices possible for signal input source selection; and FIG. 35 shows the rotation of picture attributes that can be selected in the subroutine of FIG. 27.

DESCRIPTION OF THE PREFERRED EMBODIMENTS

Figure 1:
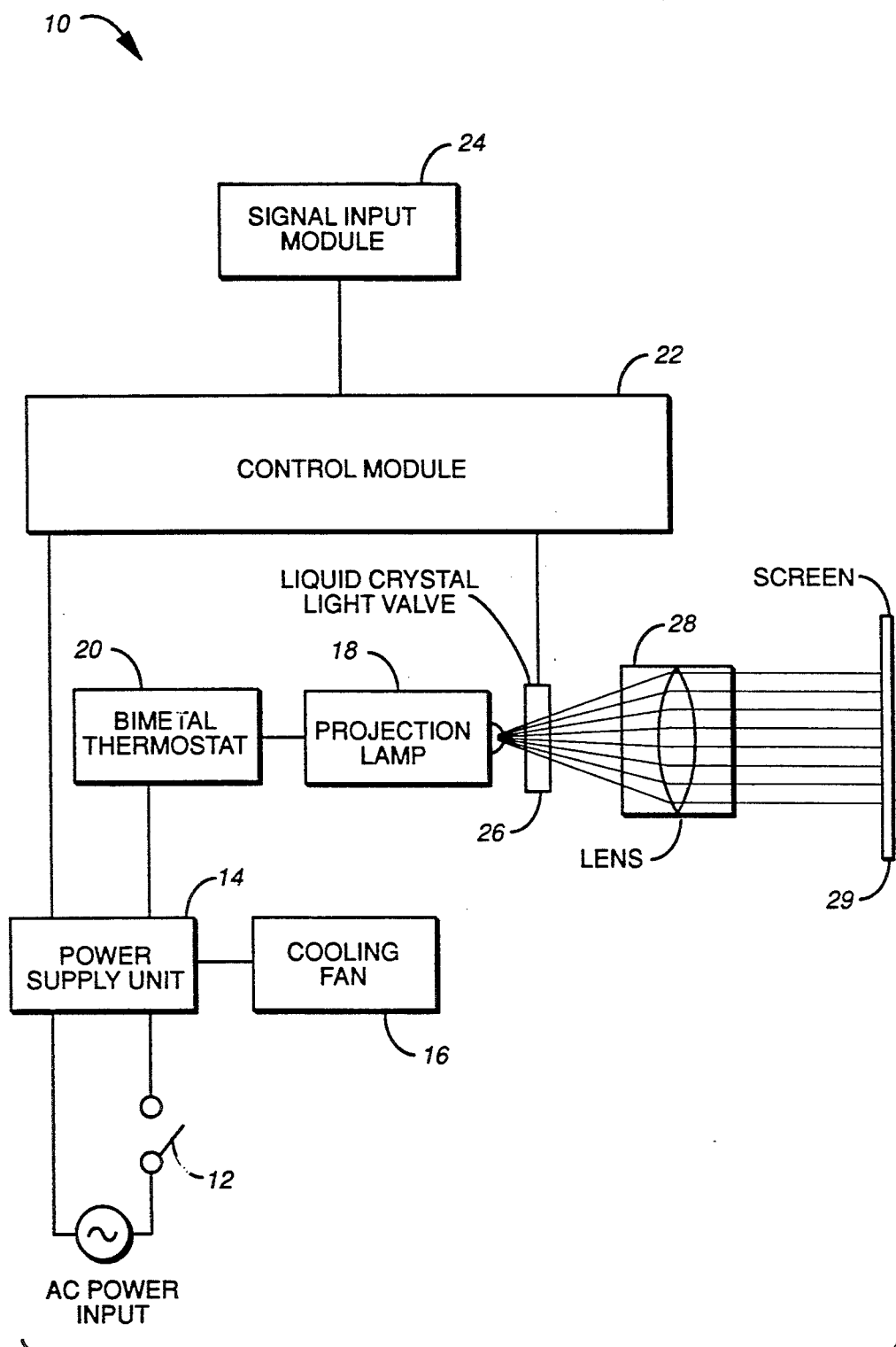
FIG. 1 is a block diagram of a prior art video projector system.

FIG. 2 is a liquid crystal video projector (LCVP), referred to by the general reference numeral 30, comprising a control unit 32 having a control input interface 34, an instruction decoder 36, a power controller 38, a signal source controller 40, a picture controller 42, an audio controller 44, a lens control interface 46, a fan motor control interface 48, a display controller 50, a light detector interface 52, a temperature detector interface 54, an alarm controller 56, and a timer 58. THe LCVP 30 is further comprised of a control input 60, a display 62, an alarm 64, a light detector 66, a temperature detector, 68, a main power controller 70, a projection lamp power controller 71, a signal source selector 74, a fan motor controller 76, a fan motor 78, a memory 80, a lens controller 82, and a digital-to-analog converter (DAC) 84. DAC 84 actually comprises six independent DACs, one each controlling five picture attributes and sound volume, described below, in an othewise conventional television receiver. A projection lamp (not shown) connected to projection lamp power controller 72 is preferably of the metal halide type. Metal halide lamps require high starting voltages for ignition. Both the starting and running voltages for the projection lamp are supplied by the projection lamp power controller and an internal ballast. Light detector 66 has a current sensing resistor in series with the projection lamp. Any failure of the projection lamp to light will be indicated by an abnormally low voltage across a sensing resistor (R1 in FIG. 5). After a pre-set time, the light detector interface 52 reports a failure of the lamp to turn-on to power controller 38.

When LCVP 30 is first turned on, the projection lamp may not start right away. If the light detector 66 senses no light, a number of retries will be attempted by the power controller 38 via projection lamp power controller 72. A failure of the lamp to start after a preset number or retries is stored in the memory 80 and is also sent to the display 62 via the display controller 50. The temperature detector 68 and temperature detector interface 54 sense the operating temperature of LCVP 30 and send a signal to the fan motor controller interface 48 to provide additional or reduced cooling, in order to maintain an optimum operating temperature. The fan motor 78 forces a variable amount of air through LCVP 30 to keep it from overheating. Several sources of signals may be selected by the signal controller 40 and signal source selector 74. The signal selection is responsive to the instruction decoder 36. For example, selections among camera, VCR, and broadcast signal input sources can be made. The picture controller 42 is also responsive to the instruction decoder 36 and provides control to set the level of the picture attributes of color, hue, brightness, contrast, and sharpness (peaking). The level of each of these picture attributes is provided as digital output to the DAC 84 and stored in the memory 80. Whenever power is turned ON, these levels are read back from memory 80 to restore the last level in use before the power to LCVP 30 was turned OFF. Sound volume is controlled by sending control signals from the instruction decoder 36 to the audio controller 44. The sound volume level is also output to the DAC 84 and stored in the memory 80. Whenever power is turned ON, the sound volume level is also read back from memory 80 to restore the last level in use before the power to LCVP 30 was turned OFF. Lens control interface 46 and lens controller 82 allow the instruction decoder 36 to control such functions as focus, zoom, and image position on a screen (not shown, but similar to scree 29 in FIG. 1). The display controller 50 supports the display 62 and the combination provides a visual status of the power controller 38, selected signal source, picture attribute levels, sound volume level, and lens control information. Any abnormal condition detected by the power controller 38 will be annunciated by the alarm 64 via supporting alarm controller 56. Any timing requirements of LCVP 30 are supported by the timer 58.

FIG. 3 is exemplary microprocessor-based implementation of LCVP 30. The functions of control unit 32 are all implemented by a microprocessor system. Several computer-implemented processes (programs) are used to replace the functional units described above. The important parts of each program are described below, in detail. The microprocessor system comprises a central processing unit (CPU) 90, a read only memory (ROM) 91, a random access memory (RAM) 92, a timer 94, and an input/output (I/O) port 93. ROM 91 stores the program for CPU 90 and RAM 92 stores temporary data and is used as a work space. Data from memory 80 is routinely read in by an initialization program and used to fill parts of RAM 92 (to improve access times later to such data). Digital interfaces are made via the I/O port 93 to control input 60; display 62, an alarm 64, light detector 66, temperature detector, 68, main power controller 70, projection lamp power controller 72, signal source selector 74, fan motor controller 76, fan motor 78, memory 80, lens controller 82, and DAC 84. Memory 80 is implemented with an erasable, electrically-programmable, read only memory (E²PROM ). However any other non-volatile memory, such as battery-backed CMOS SRAM, will also function satisfactorily. Memory 80 stores the operating status of LCVP 30, e.g., a set value for DAC 84 and a projection lamp shut-off flag.

In FIG. 4, control input 60 comprises a keypad having sixteen momentary pushbutton switches $S_1$ through $S_{16}$, an array of eight light emitting diodes (LEDs) D1 through D8, a reset switch $RS_1$, a remote control transmitter 95, and a remote control receiver 96. $RS_1$, when presed, will reset any projection lamp failure flag in RAM 92. Control input 60 interfaces to signal lines $I_0$–$I_7$ and $I_{16}$, and $O_0$–$O_3$ on I/O port 93. Table I lists the functions of each of control switch $S_1$–$S_{16}$ located on LCVP 30. Table II list the indicator meanings of each of LEDs $D_1$–$D_8$.

TABLE I (Pushbuttons)

| | |
|---|---|
| $S_1$ Power ON/OFF | $S_{10}$ "+" |
| $S_2$ Mute (sound) | $S_{11}$ Default Pict. Settings |
| $S_3$ Mode (Pict. Attribute) | $S_{12}$ Input Source Select |
| $S_4$ Volume Down | $S_{13}$ Zoom Wide |
| $S_5$ Volume Up | $S_{14}$ Zoom Tight |
| $S_6$ Focus Pattern | $S_{15}$ Initiate Auto-Focus |
| $S_7$ Focus Out | $S_{16}$ Move Image Up |
| $S_8$ Focus In | $S_{17}$ Move Image Down. |

TABLE I-continued (Pushbuttons)

| | |
|---|---|
| $S_9$ "—" | $S_{18}$ Auto Move |

The pushbotton functions of Table I are repeated in remote control transmitter 95 that is in communication with remote control receiver 96.

TABLE II (Toggle Switches)

| | |
|---|---|
| D1: Japanese/English OSD | D5: — |
| D2: Focus Info placed in Picture/Blue Raster | D6: — |
| D3: Auto/Manual Focus | D7: see Table III |
| D4: Auto-Focus Once/Continuous | D8: see Table III |

Outputs $O_0$–$O_3$ are connected in a matrix that will sense which of switches $S_1$–$S_{18}$ are closed by reading inputs $I_0$–$I_4$ while a zero is being scanned through $O_0$–$O_3$. A remote control receiver 96 receives infrared based communications from a remote control transmitter (not shown) and inputs them to $I_7$ of I/O port 93.

In FIG. 5, power to a projection lamp power supply 88 is controlled on/off by projection lamp power controller 72. Control module 32 outputs a high through the $O_4$ signal of I/O port 93. This causes transistor $T_1$ to pull in Relay $RL_1$, turning power on. The voltage produced by power supply 88 is read by light detector 66 and converted to a digital signal by $AD_2$. The digital signal is read into $I_8$ of I/O port 93. Similarly, power to power supply 86 is controlled on/off by main power controller 70. Control module 32 outputs a high through the $O_5$ signal output of I/O port 93. This causes transistor $T_2$ to pull in Relay $RL_2$, turning main power on. The temperature of LCVP 30 is sensed by a temperature sensor $TS_1$ in temperature detector 68. Analog-to-digital converter $AD_1$ supplies a digital signal that is read into $I_9$ of I/O port 93.

FIG. 6 shows the interfacing details between I/O port 93 and: the signal source selector 74, memory 80, lens controller 82, and DAC 84. Signal source selector 74 has three control signals for internal/external, video one/video two, and a "blue raster" on-off signal. (A dark blue raster is placed on the screen whenever there is no video input,to make it obvious to a user that the LCVP 30 is on.) Memory 80, in this case an $E_2$PROM, communicates permanently stored data with LCVP 30 over $I/O_1$ signal on I/O port 93. Output signals $O_{16}$–$O_{22}$ are, respectively: auto focus control (AFC), power focus far (PFF), power focus near (PFN), power zoom wide (PZW), power zoom tight (PZT), power swing up (PSU, move image on sceen up), power swing down (PSD, move image on screen down). Input signals $I_{11}$–$I_{13}$ are, respectively: focus near side (MN), focus far side (MF), and lens centered (SC). Moving the image on the screen up and down may be accomplished, for example, by moving the supporting legs of a LCVP 30 sitting on a table up and down to change the projection angle with respect to the horizontal. The leg movement, in such a case, is done with a reversible motor and gears.

FIG. 7 represents display 62, which comprises an on-screen display (OSD) 98. Messages are displayed on the video screen in Japanese or English by the OSD 98. I/O port signal line $O_6$ controls a temperature alarm light emitting diode (LED) $LD_1$. Output $O_{15}$ controls the on-screen display (OSD) 98. A high level on $O_6$ will turn-on transistor $T_3$ and therefore $LD_1$. This process is repeated for $LD_2$ using transistor $T_4$ connected to $O_7$. $LD_2$ indicates the projection lamp has burnt out and needs replacing. $LD_3$ and $LD_4$ are each dual-color LEDs. One half is red ($LD_{3r}$ and $LD_{4r}$) and the other half is green ($LD_{3g}$ and $LD_{4g}$). When both the red and green sides are lit, the color produced is orange. Low levels on 08, 09, 010, and 011 will turn on $LD_{3r}$, $LD_{3g}$, $LD_{4r}$, and $LD_{4g}$, respectively. $LD_3$ indicates the projection lamp power (on/off), and $LD_4$ indicates the condition of the power supply (on/standby).

FIG. 8 shows how I/O port 93 controls fan controller 76, fan motor 78, and alarm 64. Controller 76 is a two-speed fan controller. When both $O_{12}$ and $O_{13}$ are low, transistors $T_9$ and $T_{11}$ will be off. Transistor $T_{10}$ will therefore also be off and no current will pass through $T_{10}$ to power fan 78. A high on $O_{12}$ will bias $T_9$ on which will bias $T_{10}$ on. A three terminal series regulator $SR_1$ passes through whatever current is necessary to maintain a predetermined voltage between its output pin and a ground sensing pin. If $T_{11}$ is saturated, because $O_{13}$ is high, the collector of $T_{11}$ will pull the top of zener diode $ZD_1$ to ground. If the predetermined voltage of $SR_1$ is five volts, then five volts will be output to fan motor 78. If $ZD_1$ were a 4.7 volts zener, and $O_{13}$ went low, the pull-up resistor on the output of $SR_1$ will reverse bias $ZD_1$ to 4.7 volts, and the output of $SR_1$ across fan motor 78 will switch up to 9.7 volts. The two voltage levels (high and low) provided by $O_{13}$ therefore produce two fan speeds. The low speed has the advantage of quieter operation. The high speed will be used when the temperature of LCVP 30 indicates more cooling is required.

FIG. 9 is an exemplary "top-level" program used in an embodiment of the present invention. It is possible to accomplish the same program control of LCVP 30 with a variety of program flow approaches and designs. An initialization and control program 100 comprises a plurality of steps 101–108. Step 101 sets each port in I/O port 93 to standby. Step 102 reads the contents of memory 80 (an E$^2$PROM) to RAM 92. Next, step 103 inputs the status of switches D1–D8 and loads the data to RAM 92. LED $LD_{4r}$ is lit in step 104 to indicate standby. The program goes into a loop at step 105 waiting for an ON command from the remote control receiver 96 or from command switch $S_1$. When an ON command is received, step 106 outputs an appropriate control signal to main power controller 70. Therefore a null loop is executed until a command input causes a CPU interrupt. Command inputs are handled in step 107 and dispatched in step 108.

FIGS. 10A and 10B, step 102 is shown to actually be a subroutine comprising steps a number of steps 110–125. Switch D1 is read to see if the user has selected the on screen display (OSD) to be in Japanese or English. In step 110, if D1 is high, control will proceed to step 111 to enable Japanese. Otherwise, control will pass to step 112 to enable Eglish. Both then pass control to step 113 where switch D2 is read. If high, control passes to step 114 to superimpose focus information on the picture. Otherwise, focus information is superimposed on the blue raster in step 115. (Follow connector A to FIG. 10B.) Next, in step 116, switch D3 is read. If D3 is equal to a high, then auto-focusing is enabled in step 117. Otherwise, step 118 enables power driven manual focusing. Switch D4 is read in step 119 and if high, step 120 will cause auto-focus to operate once and stop. Otherwise, 121 will enable continuous auto-focus. Steps 122–125 read switches D7 and D8 to sense a binary combination that can have four conditions, according to Table III.

TABLE III

| D7 | D8 | Option |
|----|----|--------|
| H  | H  | none   |
| L  | H  | one    |
| H  | L  | two    |
| L  | L  | three  |

FIGS. 11A and 11B represent a terminal program comprising a plurality of steps 130–154. This program was represented in FIG. 9 as step 106. Step 130 judges whether the command received is power ON or OFF. If OFF, step 131 causes the main power to be switched off. Otherwise, program flow passes to step 132 where a projection lamp turn-off flag in RAM 92 is checked. If the flag is high, the projection lamp is turned off in step 133 (see FIG. 13 discussion, below). Otherwise, step 134 turns LED $LD_{4r}$ and turns on $LD_{4g}$ (red to green, meaning: STANDBY to ON). Step 135 causes the main power supply to switch on (via controller 70). Metal halide and other types of projection lamps require time to warm-up, so step 136 starts flashing LED $LD_{3g}$ to indicate the warm-up period. Step 137 starts the fan motor 78 at low speed. Projection lamp power is turned on in step 138, and a timer is set in step 139 to see if the projection lamp lights up in a certain time frame. If the lamp is not on after the time delay, step 140 will attempt a restart in step 141, otherwise, control proceeds to step 142 for a sixty second delay for an on-screen status display, e.g. focus, zoom, video source selections, etc. In step 143 the DAC 84 has the contents of RAM 92, which comprise picture, color, hue, and sound volume data. In step 144, both D3 and D4 are tested, and if both are high, step 145 allows auto-focusing to adjust (this auto-focus mode allows focusing to occur only once when LCVP 30 is first turned on). Then step 146 causes the current selection of an input source to be shown on the on-screen display. LED $LD_{3g}$ is then lit in step 147 to indicate the projection lamp is normal. The command loop 107 (first shown at top-level in FIG. 9) is implemented with a plurality of steps steps 148–153. First, in step 148 the internal temperature of LCVP 30 (as sensed by detector 68) is tested to see if it is above a first predetermined temperature. IF it is, control passes to step 149, the "high temperature process". Then, a projection lamp test is made and if no light is sensed, control passes to step 133. Otherwise, a test at step 152 is made to see if there has been no video input signal for more than a present time. If so, step 131 shuts off the main power. (This is useful when a user falls asleep after a station goes off the air.) Otherwise step 153 looks to see if a command has been received. If none, control loops back to step 148. Otherwise, control is dispatched in step 108 (shown in FIG. 9 also) according to the command.

FIG. 12 represents a terminal program comprising a plurality of steps 160–168. This program was represented in FIG. 11B as step 131. The subrouting turns off the main power. Step 160 saves the contents of RAM 92 to E$^2$PROM memory 80. Projection lamp power is turned off in step 161. Main power is turned off in step 162. Fan motor 78 is spun at high speed to get a quick cool-down, in step 163. LED $LD_{4g}$ is turned off and $LD_{4r}$ is turned on in step 164 to indicate power OFF.

LEDs $LD_{3g}$ and $LD_{3r}$ are flashed in step 165 to produce an orange flashing light (indicating cool-down cycle). When the temperature drops below a second predetermined temperature, as sensed in step 166, the sub-routine proceeds to step 167, which stops the fan motor 78. Otherwise, a loop is executed while waiting for cool-down. Flashing orange lights (LEDs $LD_{3g}$ and $LD_{3r}$) are turned off in step 168, which indicates to the user that cool-down has been completed.

FIG. 13 represents a terminal program comprising a plurality of steps 170–180. This program was represented in FIG. 11A as step 133, the projection lamp failure handler. The subroutine handles a failure of the projection lamp. Step 170 sets alarm 64. Step 171 turns the projection lamp power supply off. Step 172 turns the main power off. Step 173 turns off $LD_{4g}$ and turns on $LD_{4r}$ to red, to indicate STANDBY. Step 174 sets $LD_{3g}$ off and $LD_{3r}$ on. LED $LD_2$ is lit in step 175 to indicate the projection lamp needs to be replaced. A flat is set in RAM 92 to indicate the projection lamp is burnt out, in step 176. The contents of RAM 92 are then saved, in step 177, to $E^2PROM$ memory 80, so that data is not irretrievably lost when the main power is turned-off. A timeout for the fan motor 78 is implemented in step 178. In step 179 fan motor 78 is shut off. The alarm is shut-off in step 180.

FIG. 14 represents a sub-routine comprising a plurality of steps 190–202. This sub-routine was represented in FIG. 11A as step 141. The subroutine is a projection lamp restart program. Step 190 clears a loop counter. Step 191 turns projection lamp power off. Restarting is indicated to a user by turning off $LD_{3g}$ and flashing $LD_{3r}$, in step 192. LED $LD_2$ is also flashed in step 193. A time delay is inserted by step 194. Projection lamp power is turned on in step 195. Another time delay is inserted by step 196. If there is now a light output, control passes to step 201. Otherwise, another attempt to start the projection lamp is made by turning the projection lamp power off in step 198. The loop counter is incremented in step 199. If the loop count exceeds a predetermined maximum, in step 200, the loop quits and control passes to projection lamp failure handler, step 133 (FIG. 13, described above). Otherwise, the loop repeats at step 194. At step 201, $LD_{3g}$ is flashed and $LD_{3r}$ is turned off, to indicate a successful restart attempt. Then, in step 202, $LD_2$ is turned off.

FIG. 15A represents a sub-routine comprising a plurality of steps 210–216. This sub-routine was represented in FIG. 11B as step 149. The subroutine handles overheating conditions. Step 210 flashes LD1 to indicate high temperature. Next, in step 211, fan motor 78 is put on high speed. Step 212 tests to see if the temperature has dropped below the first predetermined temperature. If it has control passes to step 215, which turns off LD1 and, in step 216, puts fan motor 78 back on low speed. Otherwise, a test is made, in step 213, to see if the temperature has risen above a third predetermined temperature. If not, control loops back to step 212. But if the temperature has climbed too high, then step 214 writes the contents the contents of RAM 92 to $E^2$-PROM memory 80. (Follow connector "H" to FIG. 15B.) Step 217 turns the projection lamp power supply off. Step 218 turns the main power off. Step 219 turns off $LD_{4g}$ and turns on $LD_{4r}$ to red, to indicate STANDBY. Step 220 turns $LD_{3g}$ off and flashes $LD_{3r}$. A loop at step 221 waits while the temperature is above the third predetermined temperature. After that, fan motor 78 is stopped, in step 222. And in step 223, LEDs $LD_1$ and $LD_{3r}$ are turned off.

FIG. 16 represents an input selector sub-routine comprising a plurality of steps 230–234. This sub-routine was represented in FIG. 11B as step 146. The subroutine momentarily displays the current choice of video inlput source on the on-screen display 98. Step 230 causes all the possible video input sources to be displayed for a period determined by a time delay in step 231. Then, in step 232, the selected input source is displayed on the on-screen display for a period determined by the time delay in step 233. Step 234 then clears the on-screen display.

FIG. 17 is a command routine that is entered from dispatching step 108 in FIG. 9 and comprises a plurality of steps 240–244. The command routine allows the input source selection to be stepped from source to source. Step 240 increments a flag in RAM 92 that indicates the current input source selection. The name of the new input source is displayed on the on-screen display in step 241. I/O port 93 outputs $O_{23}$–$O_{24}$ to selector 74 in step 242.

FIG. 18 represents an auto-focus sub-routine comprising a plurality of steps 250–261. This sub-routine was represented in FIG. 11B as step 145. The subroutine permits auto-focusing at the direction of the remote control and gives an on-screen interaction. Step 250 displays a message on the on-screen display 98. Step 251 sets the AFC signal ON ($O_{16}$ from I/O port 93, FIG. 6). Since auto-focusing depends on an infrared sensor, and since the remote control works with an infrared beam, an interrupt procedure 252 (comprising steps 253–256) will temporarily suspend focusing attempts while any remote control activity is detected. Step 253 enters the interrupt procedure whenever the remote control receiver detects the remote control transmitter. Step 254 then shuts off the AFC signal and control loops in step 255 until the remote control transmission is over. Then the AFC is reestablished in step 255. (Interrupt procedure 252 will not execute if there is no concurrent auto-focusing activity.) A near and a far range signal (MN and MF) will both be true when the proper focus is obtained. Step 257 loops until both MN and MF are high. (MN and MF are returned from lens controller 82 on I/O port 93 lines $I_{11}$ and $I_{12}$, FIG. 6.) Step 258 indicates on the OSD 98 that auto-focusing has completed. Step 259 withdraws the AFC signal. A time delay is implemented in step 260 and then, in step 261, the OSD 98 display is cleared.

FIG. 19 represents a focus pattern toggle sub-routine comprising a plurality of steps 270–276. The subroutine will toggle a pattern on and off OSD 98. This allows focusing adjustments to be made with a steady target by the remote control. Step 270 checks to see if a pattern is currently being displayed. If not, step 271 checks D2 for a high level. If D2 is not high, the blue raster is turned on. Then step 273 puts a target pattern on OSD 98. (The blue raster is used to make the projected image visible when it might not otherwise be.) If a pattern was already being displayed, then it must be toggled off. Step 274 checks D2 for a high level. If D2 is not high, the blue raster is turned off. Then step 273 takes the target pattern off OSD 98.

FIG. 20 represents a power focusing sub-routine comprising a plurality of steps 280–282. The subroutine places PFF (see FIG. 6) true as long as powe focus far command is being received. Step 280 places PFF true.

Step 281 loops until power focus far command is no longer received. And step 282 places PFF false.

FIG. 21 represents a power focusing sub-routine comprising a plurality of steps 285-287 and performs the opposite function as described for FIG. 20. The subroutine places PFN (see FIG. 6) true as long as power focus near command is being received. Step 285 places PFN true. Step 286 loops until power focus near command is no longer received. And step 287 places PFN false.

FIG. 22 represents a power zoom sub-routine comprising a plurality of steps 290-292. The subroutine places PZW (see FIG. 6) true as long as power zoom wide command is being received. Step 290 places PZW true. Step 291 loops until power zoom wide command is no longer received. Then step 292 places PFF false.

FIG. 23 represents a power zoom sub-routine comprising a plurality of steps 295-297 and performs the opposite function as described for FIG. 22. The subroutine places PZT (see FIG. 6) true as long as power zoom right command is being received. Step 295 places PZT true. Step 296 loops until power zoom tight command is no longer received. Then step 297 places PZT false.

FIG. 24 represents a projected image vertical positioning sub-routine comprising a plurality of steps 300-302. The subroutine places PSU (see FIG. 6) true as long as an up command is being received. Lens controller 82 is able to motor drive a system of lenses and/or mirrors in order to swing the projected image up and down on the screen. Step 300 places PSU true. Step 301 loops until the power up command is no longer received. Then step 302 places PSU false.

FIG. 25 represents a projected image vertical positioning sub-routine comprising a plurality of steps 305-307 and performs the opposite function as described for FIG. 24. The subroutine places PSD (see FIG. 6) true as long as power down command is being received. Step 305 places PSD true. Step 306 loops until the power down command is no longer received. Then step 307 places PSD false.

FIG. 26 represents a projected image vertical centering sub-routine comprising a plurality of steps 310-316. The subroutine will drive the projected image up or down in order to center it in the middle of the range of lens controller 82. The SC signal (FIG. 6) will switch high-to-low at the center of the range. If SC is detected as high in step 310, the PSD signal is asserted in step 311, until in step 312 it is sensed as going low. As soon as it goes low, step 313 turns off the PSD signal. Similarly for if SC was initially sensed as low, step 314 issues the PSU signal until step 315 detects it went high. Then in step 316 PSU is turned off.

FIG. 27 represents a picture attribute adjusting subroutine 319 comprising a plurality of steps 302-328. The subroutine allows a selected attribute (e.g., those of FIG. 35) to be enabled for adjustment by the "+" and "−" command buttons. Step 320 indicates which picture attribute is currently indicated as selected by a flag in RAM 92 and displays a message to that effect on OSD 98. The display is held by a time delay in step 321. If a "+" or "−" or attribute select command is not presently being input, control will branch to step 325, which clears the OSD 98 and returns. Otherwise, a test is made to see if the next attribute is to be selected. If not, it must have been the "+" or "−" that was pressed (input) and control passes to step 326. Otherwise, in step 324, the next attribute is selected by incrementing the flag in RAM 92. Step 326 separates "+" from "−" and calls the appropriate subroutine 327 or 328 (described below).

FIGS. 28A and 28B represent a picture attribute incrementing sub-routine comprising a plurality of steps 330-344. The subroutine is entered from step 326 and was represented in FIG. 27 as step 327. Step 330 sets a loop counter to zero. Step 331 increments the value of a picture attribute selected in step 324. The OSD indication is updated in step 332. If this is the first pass through the loop, the loop counter will equal zero and step 333 will cause a branch to a long time delay in step 335. Otherwise, a short time delay occurs in step 334, followed by step 336, which increments the loop counter. (Follow connector "I" to FIG. 28B.) Step 337 checks to see if a "+" or "−" command is input, and if not, control flows to step 340 where a time delay is implemented. Otherwise, control passes to step 338 where a test is made to see if a picture attribute command has been input. If not, step 339 is next, otherwise the next attribute selection is stored in step 344 and branches to step 319. In step 339 a test is made to see if the "−" command has been input. If it has, control branches to step 328, otherwise, control loops back to step 331 (Follow connector "J" back to FIG. 28A). After step 340, a tes is made to see if a "+" or "−" command has been input. If yes, the loop counter is reset to zero, in step 342, and control branches to step 338. Otherwise, the display is cleared from the OSD 98, in step 343, and subroutine 327 returns.

FIGS. 29A and 29B represent a picture attribure decrementing sub-routine comprising a plurality of steps 350-364. The subroutine is entered from step 326 and was represented in FIG. 27 as step 328. Step 350 sets a loop counter to zero. Step 351 decrements the value of a picture attribute selected in step 324. The OSD indication is updated in step 352. If this is the first pass through the loop, the loop counter will equal zero and step 353 will cause a branch to a long time delay in step 355. Otherwise, a short time delay occurs in step 354, followed by step 356, which increments the loop counter. (Follow connector "K" to FIG. 29B.) Step 357 checks to see if a "+" or "−" command is input, and if not, control flows to step 360 where a time delay is implemented. Otherwise, control passes to step 358 where a test is made to see if a picture attribute command has been input. If not, step 359 is next, otherwise the next attribute selection is stored in step 364 which then branches to step 319. In step 359 a test is made to see if the "+" command has been input. If it has, control branches to step 327, otherwise, control loops back to step 351 (follow connector "L" back to FIG. 28A). After step 360, a test is made to see if a "+" or "−" command has been input. If yes, the loop counter is reset to zero, in step 362, and control branches to step 358. Otherwise, the display is cleared from the OSD 98, in step 363, and subroutine 328 returns.

FIG. 30 represents a default setting sub-routine 369 comprising a plurality of steps 370-374. The subroutine 369 indicates the default settings on the OSD 98 in step 370. All the picture attributes are set to their default values in step 371. The new values are output to DAC 84 in step 372. A time delay is implemented in step 373 (to keep the OSD display on long enough to read it). The OSD display is cleared in step 374, and subroutine 369 then returns.

FIGS. 31A and 31B represents a sound volume increase subroutine 379 comprising a plurality of steps 380-393. The subroutine 379 sets a loop counter to zero in step 380. Step 381 increments the sound volume value stored in RAM 92 by one. The new value is output to DAC 84 in step 382. The OSD indication is updated in step 383. If this is the first pass through the loop, the loop counter will equal zero and step 384 will cause a branch to a long time delay in step 386. Otherwise, a short time delay occurs in step 385, followed by step 387, which increments the loop counter. (Follow connector "M" to FIG. 31B.) Step 388 checks to see if a sound volume increase/decrease command has been input, and if not, control flows to step 390 where a time delay is implemented. Otherwise, control passes to step 389 where a test is made to see if a sound volume increase command has been input. If yes, control loops back to step 381 (follow connector "N" back to FIG. 31A). Otherwise, it must have been a sound volume decrease and control branches to subroutine 399 (described below). In step 391 a test is made to see if the sound volume increase/decrease command has been input. If it has, control branches to step 392 where the loop counter is reset to zero, and control branches to step 389. Otherwise, the display is cleared from OSD 98, in step 393, and subroutine 379 returns.

FIGS. 32A and 32B represents a sound volume decrease subroutine 399 comprising a plurality of steps 400-413. The subroutine 399 sets a loop counter to zero in step 400. Step 401 decrements the sound volume value stored in RAM 92 by one. The new value is output to DAC 84 in step 402. The OSD indication is updated in step 403. If this is the first pass through the loop, the loop counter will equal zero and step 404 will cause a branch to a long time delay in step 406. Otherwise, a short time delay occurs in step 405, followed by step 407, which increments the loop counter. (Follow connector "O" to FIG. 32B.) Step 408 checks to see if a sound volume increase/decrease command has been input, and if not, control flows to step 410 where a time delay is implemented. Otherwise, control passes to step 409 where a test is made to see if a sound volume decrease command has been input. If yes, control loops back to step 401 (follow connector "P" back to FIG. 32A). Otherwise, it must have been a sound volume increase and control branches to subroutine 379. In step 411 a test is made to see if the sound volume increase/decrease command has been imput. If it has, control branches to step 412 where the loop counter is reset to zero, and control branches to step 409. Otherwise, the display is cleared from OSD 98, in step 413, and subroutine 399 returns.

FIG. 33 represents a sound muting subroutine 419 comprising steps 420-424. The muting will be toggled on or off depending on the current state of muting. In step 420 a test is made to see if sound has already been muted. If not, step 421 saves the original sound volume setting in RAM 92 and outputs a sound volume value of zero to DAC 84. The new condition is displayed on OSD 98 in step 422. Otherwise, the original sound volume is restored from RAM 92 and the OSD 98 is cleared. Subroutine 419 then returns.

While the invention has been described in conjunction with specific embodiments, it will be apparent to those skilled in the art that many further alternatives, modifications, and variations will be possible, in light of the foregoing disclosure. Thus, the invention described herein is intended to embrace all such alternatives, modifications, applications, equivalents, and variations as fall within the spirit and scope of the claims below.

What is claimed is:

1. A liquid crystal video projector (LCVP), comprising:
    means for communicating a plurality of operating commands from locations both remote and local to the LCVP, the communication means having means to control a plurality of LCVP operating modes, said operating mode control means comprising a digital-to-analog converter;
    means to detect when a projection lamp is operating;
    power supply/ballast means to operate said projection lamp responsive to said operating mode control means and having means to attempt a limited number of projection lamp lighting restarts in response to the projection lamp detection means;
    temperature sensing means for comparing the actual operating temperatures of the LCVP to a plurality of predetermined operating temperatures; main power ON/OFF control means responsive to said operating mode control means;
    a variable-speed fan for cooling of the LCVP, the fan speed responsive to the temperature sensing means such that a predetermined operating temperature is maintained;
    alarm means to signal a user that at least one of said predetermined operating temperatures has been exceeded or that said projection lamp fails to operate, the alarm means responsive to the temperature sensing means and projection lamp restart means, the alarm means able to control the main power ON/OFF means and power supply/ballast means;
    lens control means to control a system of lenses in response to said operating mode control means, the lens control means comprises means to zoom, means to focus, and means to move a projected image from a first position to a second position within a limited range on a projection screen, each means responsive to said operating mode control means;
    means to select one of a plurality of signal sources to input to the LCVP, the selection means responsive to said operating mode control means;
    means to adjust a plurality of picture attributes in response to said operating mode control means;
    means to adjust sound volume in response to said operating mode control means;
    means to memorialize and to restore said plurality of picture attributes and sound volume adjustments such that after power to the LCVP is turned off and back on, such adjustments as they existed before the power was turned off are restored after power is turned back on to their preexisting values; and
    display means to indicate to a user a present status of each of said picture attributes and sound adjustments and to assist said user in the adjustment of said projected image on said projection screen, the display means comprising a plurality of indicator lights and an on-screen display system.

2. The projector of claim 1, wherein:
    the means to memorialize and to restore comprises an erasable electrically-programmable read only memory ($E^2PROM$);
    said first position and said second position of said projected image are in vertical alignment with one another;

said means to move said projected image comprises means to automatically center said image in said limited range; and said on-screen display system comprises timer means to hold an on-screen display image for a predetermined time.

3. A video projector, comprising:

means to project a video picture on to a screen, the projection means comprising imaging means having a liquid crystal device, a projection lamp with a power supply/ballast, and lens control means for adjusting the focus, size, and position of said video picture on said screen· remote control means for adjusting a plurality of video picture attributes and at least one sound volume;

means to start said projection lamp and to restart said projection lamp a limited number of times if said projection lamp fails to start;

heat sensing and cooling means for maintaining an operating temperature of the video projector within predetermined bounds, the means able to signal an alarm and to shut-off a main power supply for the LCVP when said operating temperature exceeds said bounds;

input selection means for choosing among a plurality of signal sources to be input to the video projector, the selection means in communication with the video projection means;

command and indication means for accepting and processing user adjustments and inputs, the means comprising means to control said lens control means, said video picture, and said sound.

4. The projector of claim 3, wherein: the heat sensing and cooling means comprises a variable-speed fan that runs at an increased speed after the video projector has been turned-off thereby shortening the time necessary to cool-down the video projector.

5. The projector of claim 3, wherein: the remote control means comprises an infrared transmitter and receiver, said transmitter being hand-held and portable.

6. The projector of claim 3, wherein:

said video picture is projected in color; and said remote control means comprises adjustments for stereo sound channels.

7. The projector of claim 3, wherein:

said projection lamp is a metal halide type lamp with an appropriate ballast; and the means to start said projection lamp comprises means to signal an alarm and to shut-off a main power supply for the LCVP when said projection lamp fails to start after said limited number of times.

8. An improved liquid crystal video projection system having a projection lamp, a liquid crystal video panel device, a system of lenses, and a remote control system, the improvement comprising:

means to adjust the system of lenses such that a projected image can be moved from a first position to a second position within a limited range on a projection screen in response to a first and second command input to the remote control system and such that a third command input to the remote control system will cause said projected image to be automatically centered within said limited range.

9. The improvements in the system of claim 8, further comprising:

power supply means to attempt to start said projection lamp and to restart said projection lamp a limited number of times if said projection lamp fails to start.

10. The improvements in the system of claim 9, further comprising:

means to signal an alarm and to shut-off a main power supply for the system when said projection lamp fails to start after said limited number of times.

11. The improvements in the system of claim 8, further comprising:

an auto-focus means capable to being temporarily suspended from focusing during a transmission of an infrared beam of light by the remote control system.

12. A video projector, comprising:

imaging means comprising at least one liquid crystal display device;

a projection lamp positioned such that an image will be projected on a screen via the imaging means and a system of mirrors and lenses;

means for monitoring the operation of the projection lamp;

power supply means for controlling the operation of the projection lamp, the means responsive to the monitoring means;

means for displaying to a user a current condition of the projection lamp, the means responsive to the monitoring means; and remote control means for adjusting said image on said screen by a user.

13. The projector of claim 12, wherein: the monitoring means comprises a temperature sensor.

14. The projector of claim 12, wherein: the monitoring means comprises a current sensor in series with the projection lamp.

15. The projector of claim 12, wherein: the remote control means comprises an infrared transmitter and receiver.

16. The projector of claim 15, wherein: said adjustment of said image comprises a picture zoom means, a picture focus means, a picture positioning means, a picture attribute adjustment means, and an auto-focus means having infrared ranging means.

17. The projector of claim 16, wherein: said picture attribute adjustment means comprises adjustments for picture attributes of: brightness, contrast color, hue, and sharpness.

18. The projector of claim 16, wherein: said auto-focus means is temporarily suspended from focusing during a transmission of an infrared beam of light by the remote control means.

19. The projector of claim 12, wherein: the power supply controlling means comprises means to cool the projection lamp at various levels and, alternatively, shut-off the projection lamp in response to the monitoring means.

20. The projector of claim 12, wherein: the power supply controlling means comprises means to start and restart the projection lamp in response to the nonitoring means.

21. A video projector, comprising:

a microprocessor having a ROM memory and a RAM memory;

imaging means comprising at least one liquid crystal display device connected to television;

a projection lamp positioned such that a television image will be projected on a screen via the imaging means and via a system of lenses;

means for monitoring the operation of the projection lamp connected to the microprocessor;

power supply means for controlling the operation of the projection lamp, the means responsive to the monitoring means and connected to the microprocessor;

means for displaying whether or not the projection lamp is functional, the means responsive to the monitoring means and connected to the microprocessor; and remote control means connected to the microprocessor for adjusting said image on said screen by a user.

22. The projector of claim 21, further comprising: non-volatile random access memory means for saving said adjustments of said screen image during any periods that the projector is turned off.

23. A computer-implemented process in a liquid crystal video projector system having a microprocessor, a picture auto-focus means, and a infrared-based remote control means, comprising the steps of:

suspending said auto-focus means from focusing a picture during reception of a transmission of an imfrared light beam by said remote control means; and resuming said auto-focusing of said picture after said transmission of said infrared light beam has ended.

24. A liquid crystal video projector having an illumination subsystem including a light source for providing an illuminating beam, a modulation subsystem provided to receive said beam to produce a modulatad output for projection of a formed image onto a surface, said illumination subsystem including auto light source checking means comprising:

a. means to detect the presence or absence of said beam, b. means to turn on power to said light source, c. means to delay the operation of said detection means for a first predetermined period of time after power is supplied to said light source so that said light source has sufficient time to become illuminated, d. means to turn off said power supply if said detection means does not detect said beam after said predetermined period of time and initiate a second predetermined period of time, and thereafter re-initiate said power means and said delay means to turn on said light source, e. counter means to keep track of the number of said reinitiations, and f. means to terminate said re-initiations after said counter means reaches a predetermined count.

25. The liquid crystal video projector of claim 24 including means to visually indicate the status of said beam.

26. A computer-implemented process in a liquid crystal video projector (LCVP) system having a microprocessor with a RAM memory and an erasable electrically-programmable read only memory ($E^2PROM$), comprising the steps of:

setting an audible user alarm;

turning-off a power supply for a projection lamp;

turning-off a main power supply for the LCVP system;

setting a visual user alarm;

setting a lamp failure flag in the RAM memory;

writing at least one flag in the RAM memory to the $E^2PROM$;

waiting a predetermined time;

stopping a fan motor used to cool the LCVP system;

resetting said audible user alarm.

27. A liquid crystal video projector having an illumination subsystem including a light source for providing an illuminating beam, a modulation subsystem provided to receive said beam to produce a modulated output for projection of a formed image onto a surface, a fan means to cool said projector, and means to increase or decrease said fan speed, said projector comprising:

a. means to periodically detect the temperature of said projector;

b. means to increase said fan speed if said projector temperature is above a first predetermined temperature;

c. means to determine if said projector temperature has cooled below said first predetermined temperature and decrease said fan speed: and d. means to turn off said light source and power to said projector if said projector temperature exceeds a second predetermined temperature, said second predetermined temperature being greater than said first predetermined temperature.

28. The liquid crystal video projector of claim 27 wherein said fan means is maintained at said increased fan speed after detection of said second predetermined temperature and turn-off of said light source and projector power until said projector temperature has cooled below said second predetermined temperature after which said fan means is turned off.

29. The liquid crystal video projector of claim 28 wherein visual display means indicates when said projector temperature exceeds said first predetermined temperature, when said projector temperture exceeds said second predetermined temperature after said light source and projector power have been turned off and said fan means continues in operation to cool said projector below said second predetermined temperature.

* * * * *